US012757187B2

(12) United States Patent
Elshafie et al.

(10) Patent No.: US 12,757,187 B2
(45) Date of Patent: Oct. 6, 2026

(54) INDICATING RESOURCE USAGE

(71) Applicant: QUALCOMM Incorporated, San Diego, CA (US)

(72) Inventors: Ahmed Elshafie, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 18/336,783

(22) Filed: Jun. 16, 2023

(65) Prior Publication Data

US 2024/0422767 A1 Dec. 19, 2024

(51) Int. Cl.
*H04W 72/121* (2023.01)
*H04W 72/30* (2023.01)

(52) U.S. Cl.
CPC ......... *H04W 72/121* (2013.01); *H04W 72/30* (2023.01)

(58) Field of Classification Search
CPC . H04W 72/121; H04W 72/541; H04W 72/30; H04W 72/23
See application file for complete search history.

(56) References Cited

U.S. PATENT DOCUMENTS

2021/0218495 A1* 7/2021 Bi .......................... H04L 1/1825
2021/0250872 A1* 8/2021 Takeda ................ H04W 52/245
2021/0392702 A1* 12/2021 Han .................. H04W 72/0466
2024/0259847 A1* 8/2024 Maldonado .......... H04B 17/345
2025/0097939 A1* 3/2025 Tan ...................... H04B 17/309

* cited by examiner

*Primary Examiner* — Gbemileke J Onamuti
(74) *Attorney, Agent, or Firm* — Loza & Loza LLP

(57) ABSTRACT

Aspects relate to communicating an indication of whether a user equipment (UE) will use an allocated shared resource. A first UE may output an indication of whether it will use a resource (e.g., a configured grant occasion) of a set of resources that are allocated for the first UE and at least one other UE. A first UE may select a communication mode for transmission via a resource based on an obtained indication of whether a second UE will use the resource. A network entity may output a groupcast message that indicates whether a particular UE will use a resource of a set of resources that are allocated for a plurality of UEs. A first UE may select a communication mode for transmission via a resource based on a groupcast message obtained from a network entity.

27 Claims, 26 Drawing Sheets

1500

INDICATING RESOURCE USAGE

TECHNICAL FIELD

The technology discussed below relates generally to wireless communication and, more particularly, to procedures associated with indicating whether a wireless node will use an allocated resource.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) to be used by different UEs operating within the cell. To this end, a base station may send downlink control information to a UE to schedule a UE for communication on allocated resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, an apparatus for wireless communication may include a processing system. The processing system may be configured to obtain a first message, the first message indicating an allocation of at least one shared resource for at least one transmission by any of a plurality of user equipment (UEs). The processing system may also be configured to output a second message for transmission to at least one user equipment (UE) of the plurality of UEs, the second message indicating whether the apparatus will use a first resource of the at least one shared resource.

In some examples, a method for wireless communication at an apparatus is disclosed. The method may include obtaining a first message, the first message indicating an allocation of at least one shared resource for at least one transmission by any of a plurality of user equipment (UEs). The method may also include outputting a second message for transmission to at least one user equipment (UE) of the plurality of UEs, the second message indicating whether the apparatus will use a first resource of the at least one shared resource.

In some examples, an apparatus for wireless communication may include means for obtaining a first message, the first message indicating an allocation of at least one shared resource for at least one transmission by any of a plurality of user equipment (UEs). The apparatus may also include means for outputting a second message for transmission to at least one user equipment (UE) of the plurality of UEs, the second message indicating whether the apparatus will use a first resource of the at least one shared resource.

In some examples, a non-transitory computer-readable medium has stored therein instructions executable by a processing system of an apparatus to obtain a first message, the first message indicating an allocation of at least one shared resource for at least one transmission by any of a plurality of user equipment (UEs). The computer-readable medium may also have stored therein instructions executable by the processing system of the apparatus to output a second message for transmission to at least one user equipment (UE) of the plurality of UEs, the second message indicating whether the apparatus will use a first resource of the at least one shared resource.

In some examples, a first user equipment (UE) may include a transceiver, and a processing system. The transceiver may be configured to receive a first message, the first message indicating an allocation of at least one shared resource for at least one transmission by any of a plurality of user equipment (UEs), the plurality of UEs including the first UE. The transceiver may also be configured to transmit a second message to at least one second (UE) of the plurality of UEs, the second message indicating whether the first UE will use a first resource of the at least one shared resource.

In some examples, an apparatus for wireless communication may include a processing system. The processing system may be configured to obtain a first message from a network entity, the first message indicating an allocation of at least one shared resource for at least one transmission by any of a plurality of user equipment (UEs), the plurality of UEs including a first user equipment (UE). The processing system may also be configured to obtain a second message from the first UE, the second message indicating whether the first UE will use a first resource of the at least one shared resource. The processing system may further be configured to output a third message for transmission via the first resource according to a first communication mode selected based on the second message.

In some examples, a method for wireless communication at an apparatus is disclosed. The method may include obtaining a first message from a network entity, the first message indicating an allocation of at least one shared resource for at least one transmission by any of a plurality of user equipment (UEs), the plurality of UEs including a first user equipment (UE). The method may also include obtaining a second message from the first UE, the second message indicating whether the first UE will use a first resource of the at least one shared resource. The method may further include outputting a third message for transmission via the first resource according to a first communication mode selected based on the second message.

In some examples, an apparatus for wireless communication may include means for obtaining a first message from a network entity, the first message indicating an allocation of at least one shared resource for at least one transmission by any of a plurality of user equipment (UEs), the plurality of UEs including a first user equipment (UE). The apparatus may also include means for obtaining a second message from the first UE, the second message indicating whether the first UE will use a first resource of the at least one shared resource. The apparatus may further include means for outputting a third message for transmission via the first resource according to a first communication mode selected based on the second message.

In some examples, a non-transitory computer-readable medium has stored therein instructions executable by a processing system of an apparatus to obtain a first message from a network entity, the first message indicating an allocation of at least one shared resource for at least one transmission by any of a plurality of user equipment (UEs), the plurality of UEs including a first user equipment (UE). The computer-readable medium may also have stored therein instructions executable by the processing system of the apparatus to obtain a second message from the first UE, the second message indicating whether the first UE will use a first resource of the at least one shared resource. The computer-readable medium may further have stored therein instructions executable by the processing system of the apparatus to output a third message for transmission via the first resource according to a first communication mode selected based on the second message.

In some examples, a first user equipment (UE) may include a transceiver, and a processing system. The transceiver may be configured to receive a first message from a network entity, the first message indicating an allocation of at least one shared resource for at least one transmission by any of a plurality of user equipment (UEs), the plurality of UEs including the first UE and the second UE. The transceiver may also be configured to receive a second message from the second UE, the second message indicating whether the second UE will use a first resource of the at least one shared resource. The transceiver may further be configured to transmit a third message via the first resource according to a first communication mode selected based on the second message.

In some examples, an apparatus for wireless communication may include a processing system. The processing system may be configured to obtain a first message from a network entity, the first message indicating an allocation of at least one shared resource for at least one transmission by any of a plurality of user equipment (UEs), the plurality of UEs including a first user equipment (UE) and a second UE. The processing system may also be configured to obtain a groupcast message from the network entity, the groupcast message indicating whether the first UE will use a first resource of the at least one shared resource. The processing system may further be configured to output a second message for transmission via the first resource according to a first communication mode selected based on the groupcast message.

In some examples, a method for wireless communication at an apparatus is disclosed. The method may include obtaining a first message from a network entity, the first message indicating an allocation of at least one shared resource for at least one transmission by any of a plurality of user equipment (UEs), the plurality of UEs including a first user equipment (UE) and a second UE. The method may also include obtaining a groupcast message from the network entity, the groupcast message indicating whether the first UE will use a first resource of the at least one shared resource. The method may further include outputting a second message for transmission via the first resource according to a first communication mode selected based on the groupcast message.

In some examples, an apparatus for wireless communication may include means for obtaining a first message from a network entity, the first message indicating an allocation of at least one shared resource for at least one transmission by any of a plurality of user equipment (UEs), the plurality of UEs including a first user equipment (UE) and a second UE. The apparatus may also include means for obtaining a groupcast message from the network entity, the groupcast message indicating whether the first UE will use a first resource of the at least one shared resource. The apparatus may further include means for outputting a second message for transmission via the first resource according to a first communication mode selected based on the groupcast message.

In some examples, a non-transitory computer-readable medium has stored therein instructions executable by a processing system of an apparatus to obtain a first message from a network entity, the first message indicating an allocation of at least one shared resource for at least one transmission by any of a plurality of user equipment (UEs), the plurality of UEs including a first user equipment (UE) and a second UE. The computer-readable medium may also have stored therein instructions executable by the processing system of the apparatus to obtain a groupcast message from the network entity, the groupcast message indicating whether the first UE will use a first resource of the at least one shared resource. The computer-readable medium may further have stored therein instructions executable by the processing system of the apparatus to output a second message for transmission via the first resource according to a first communication mode selected based on the groupcast message.

In some examples, a first user equipment (UE) may include a transceiver, and a processing system. The transceiver may be configured to receive a first message from a network entity, the first message indicating an allocation of at least one shared resource for at least one transmission by any of a plurality of user equipment (UEs), the plurality of UEs including the first UE and a second UE. The transceiver may also be configured to obtain a groupcast message from the network entity, the groupcast message indicating whether the second UE will use a first resource of the at least one shared resource. The transceiver may further be configured to transmit a second message via the first resource according to a first communication mode selected based on the groupcast message.

In some examples, an apparatus for wireless communication may include a processing system. The processing system may be configured to output a first message for transmission to a plurality of user equipment (UEs), the first message indicating an allocation of at least one shared resource for at least one transmission by any of the plurality of UEs, the plurality of UEs including a first user equipment (UE). The processing system may further be configured to output a groupcast message for transmission to two or more of the plurality of UEs, the groupcast message indicating whether the first UE will use a first resource of the at least one shared resource.

In some examples, a method for wireless communication at an apparatus is disclosed. The method may include outputting a first message for transmission to a plurality of user equipment (UEs), the first message indicating an allocation of at least one shared resource for at least one transmission by any of the plurality of UEs, the plurality of UEs including a first user equipment (UE). The method may also include outputting a groupcast message for transmission to two or more of the plurality of UEs, the groupcast message indicating whether the first UE will use a first resource of the at least one shared resource.

In some examples, an apparatus for wireless communication may include means for outputting a first message for transmission to a plurality of user equipment (UEs), the first message indicating an allocation of at least one shared resource for at least one transmission by any of the plurality of UEs, the plurality of UEs including a first user equipment (UE). The apparatus may also include means for outputting a groupcast message for transmission to two or more of the plurality of UEs, the groupcast message indicating whether the first UE will use a first resource of the at least one shared resource.

In some examples, a non-transitory computer-readable medium has stored therein instructions executable by a processing system of an apparatus to output a first message for transmission to a plurality of user equipment (UEs), the first message indicating an allocation of at least one shared resource for at least one transmission by any of the plurality of UEs, the plurality of UEs including a first user equipment (UE). The computer-readable medium may also have stored therein instructions executable by the processing system of the apparatus to output a groupcast message for transmission to two or more of the plurality of UEs, the groupcast message indicating whether the first UE will use a first resource of the at least one shared resource.

In some examples, a network entity may include a transceiver, and a processing system. The transceiver may be configured to transmit a first message to a plurality of user equipment (UEs), the first message indicating an allocation of at least one shared resource for at least one transmission by any of the plurality of UEs, the plurality of UEs including a first user equipment (UE). The transceiver may also be configured to transmit a groupcast message to two or more of the plurality of UEs, the second message indicating whether the first UE will use a first resource of the at least one shared resource.

These and other aspects of the disclosure will become more fully understood upon a review of the detailed description which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
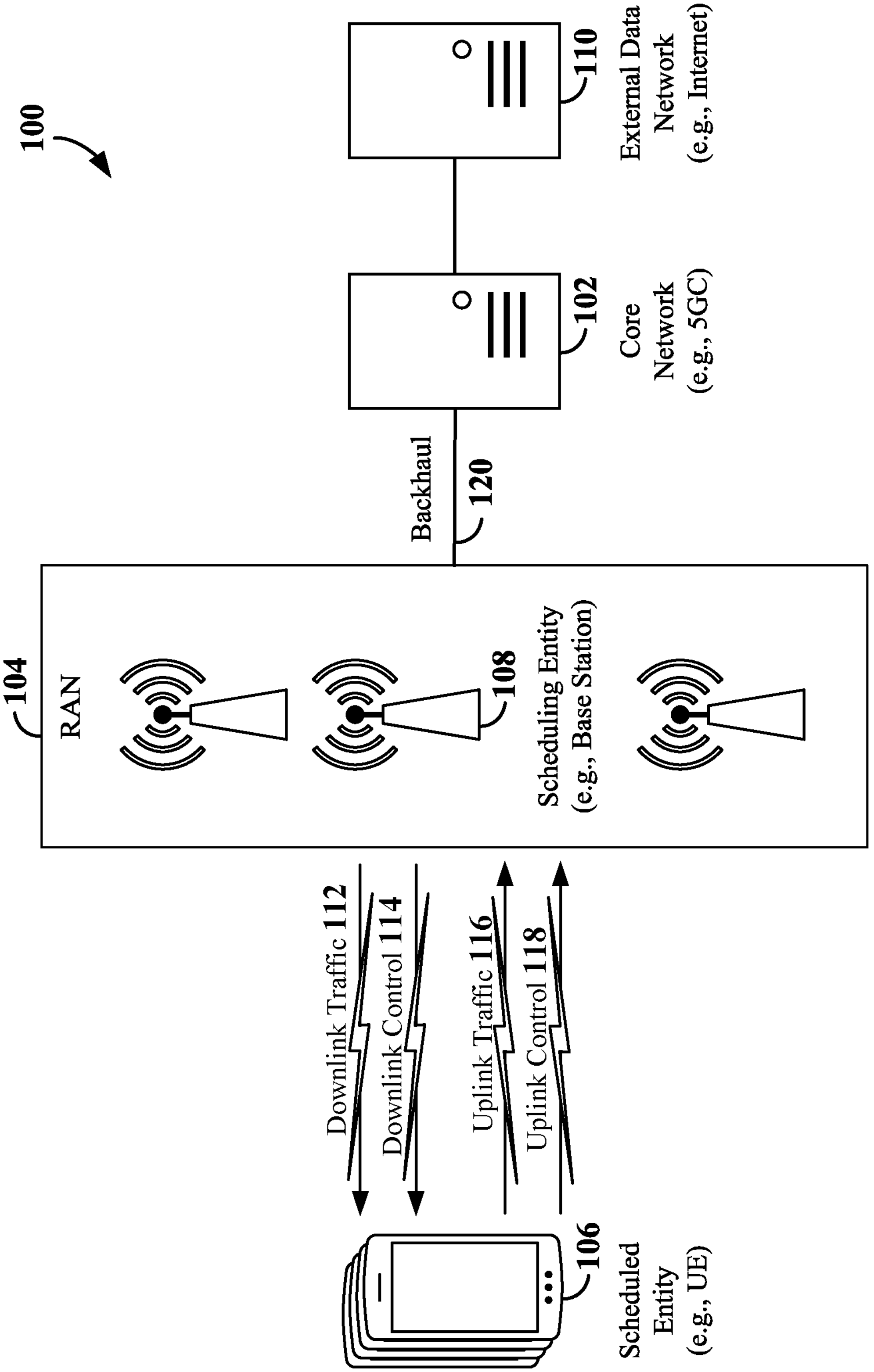
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to communicating an indication of whether a user equipment (UE) will use an allocated shared resource. In some examples, a shared resource refers to a resource (e.g., a specific set of frequency and time resources) that has been scheduled for concurrent use by multiple UEs. In some examples, a first UE may output an indication of whether it will use a resource (e.g., a configured grant occasion) of a set of resources that are allocated for concurrent use by the first UE and at least one other UE. In some examples, a first UE may select a communication mode for transmission via a resource based on an obtained indication of whether a second UE will use the resource. In some examples, a network entity may output a groupcast message that indicates whether a particular UE will use a resource of a set of resources that are allocated for a plurality of UEs. In some examples, a first UE may select a communication mode for transmission via a resource based on a groupcast message obtained from a network entity.

In some examples, the disclosure relates to techniques for informing neighboring UEs that a given UE will not use one or more shared resources (e.g., configured uplink occasions) whereby the other UEs that share the resource can change their communication mode (transmission parameters) when using that resource. In some examples, the disclosed techniques may be used in a non-orthogonal multiple access (NOMA) framework or some other non-orthogonal framework for reducing UE interference in the uplink and thereby improve the uplink block error rate (BLER).

Various techniques may be used for indicating whether a particular UE will use a shared resource. In some examples, a first UE sends an indication to other UEs regarding whether the first UE will conduct a transmission (e.g., conduct an uplink transmission after receiving an uplink grant, conduct a sidelink transmission, etc.). This signaling may employ a cross-link interference (CLI) framework, a conventional channel, a sidelink channel, backscattering, or other signaling. In some examples, a network entity (e.g., a gNB) sends an indication to one or more UEs regarding whether a first UE will conduct a transmission (e.g., an uplink transmission) on a shared resource.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
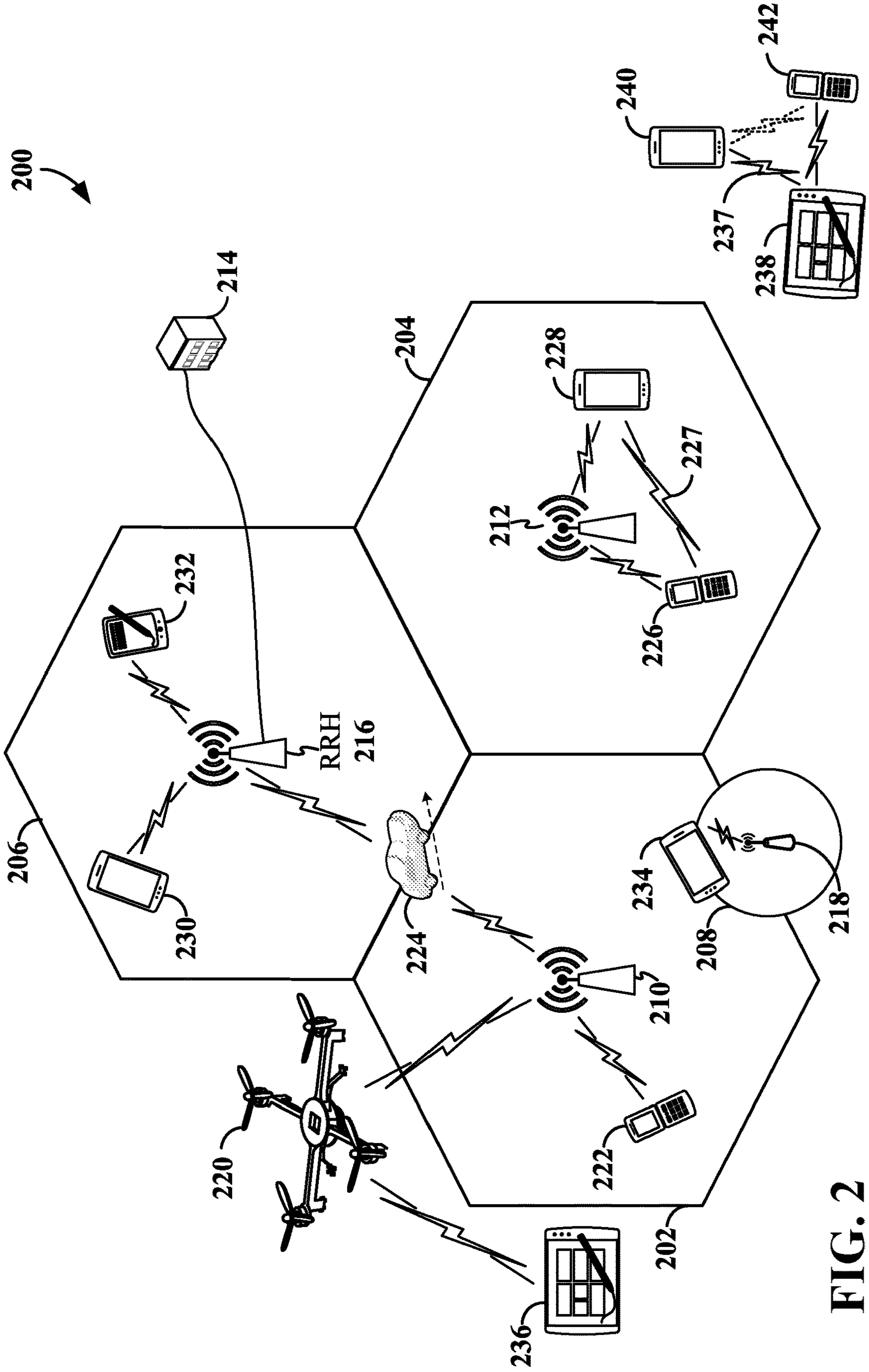
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
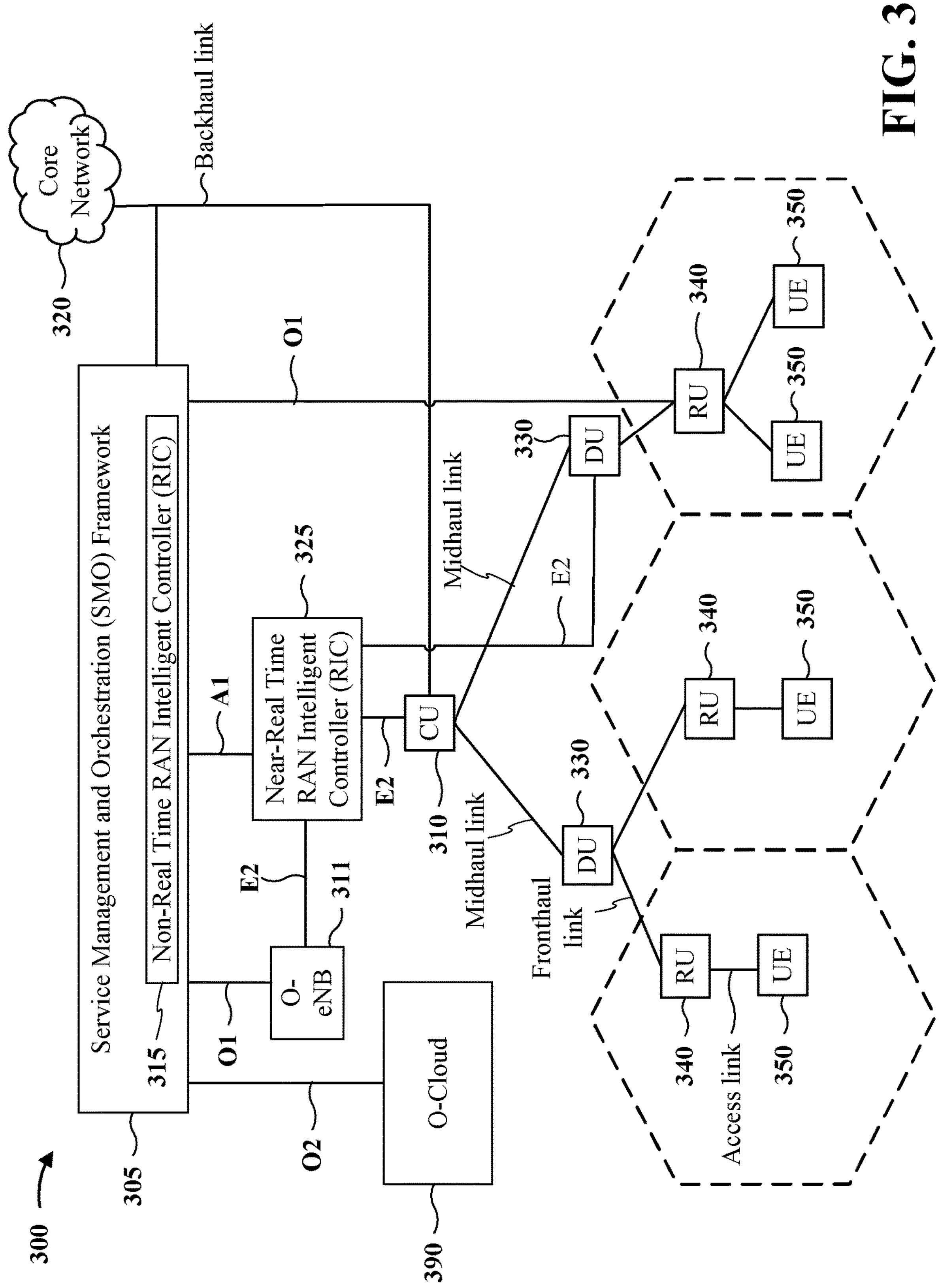
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
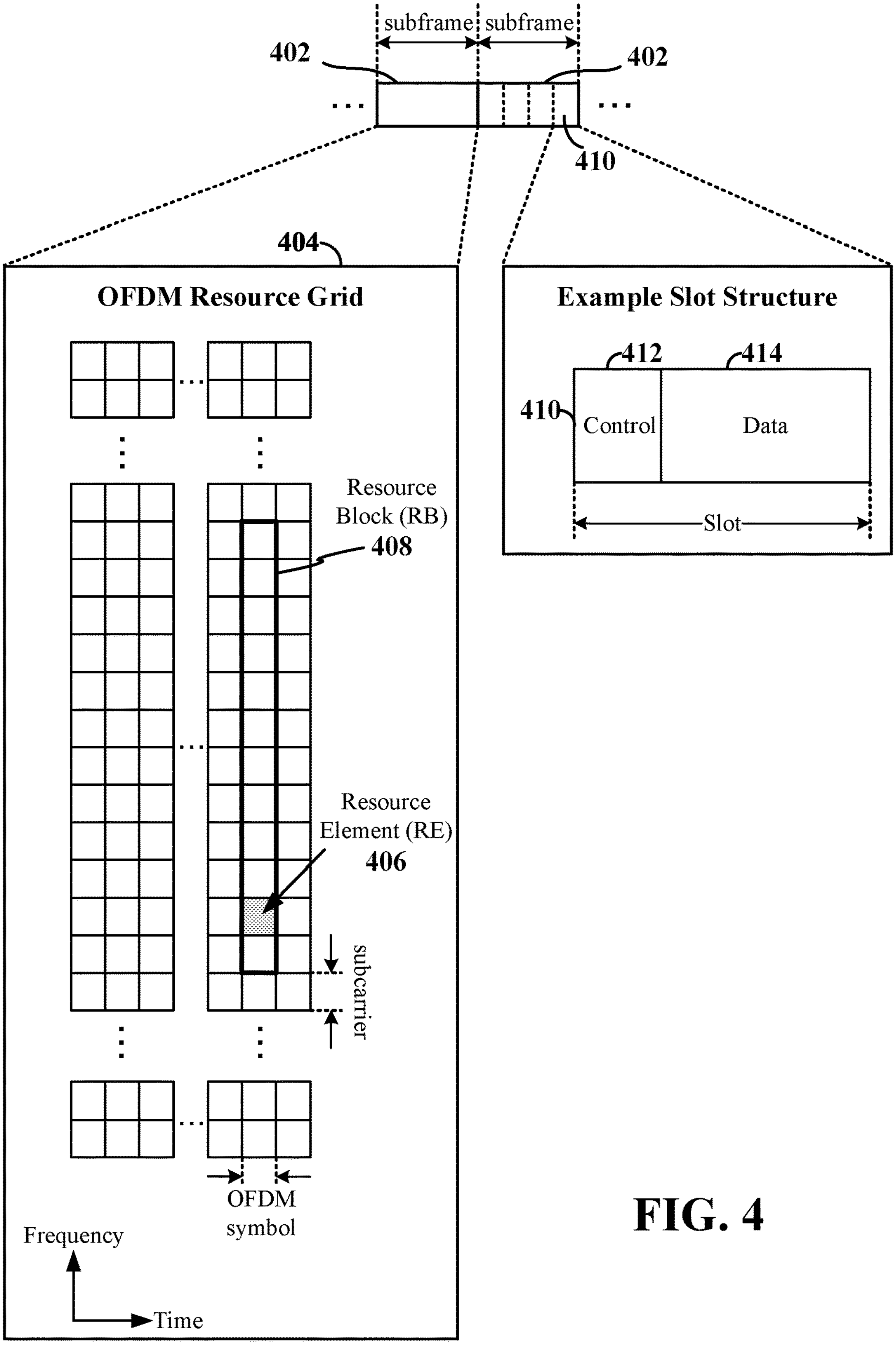
FIG. 4 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

As mentioned above, a base station may send an UL grant or a DL grant to a UE. An UL grant may specify, for example, which resource blocks and/or which modulation and coding scheme (MCS) the BS has allocated to the UE for an UL transmission. A DL grant may specify, for example, which resource blocks and/or which MCS the BS will use for a DL transmission. Different types of grants may be used in different examples.

For a dynamic grant, a base station may send DCI to a UE to schedule an individual transmission or reception (e.g., on a physical downlink shared channel (PDSCH) or a physical uplink shared channel (PUSCH)). For example, after a UE requests uplink resources, a base station may send a first DCI to schedule a first PUSCH transmission by the UE. Then, after a UE requests additional uplink resources, the base station may send a second DCI to schedule a second PUSCH transmission, and so on.

For a configured grant (also referred to as a grant-free scheduling), a base station may configure uplink resources without having received a request for uplink resources from a UE. For example, the base station may transmit a radio resource control (RRC) message or a DCI to indicate that certain uplink resources have been pre-configured. In some implementations, a base station may send DCI or an RRC message to activate or deactivate a configured grant (e.g., activate/deactivate the use of configured physical uplink control channel (PUCCH) occasions and/or PUSCH occasions).

A base station may also use semi-persistent scheduling (SPS) to schedule multiple transmissions (e.g., on PDSCH). In some examples, a base station may transmit an RRC message to configure an SPS (e.g., for a particular cell and a particular BWP) and subsequently send DCI to activate the SPS. The SPS configuration may indicate an SPS periodicity between SPS occasions. In this way, the SPS configuration may schedule multiple SPS occasions at the indicated periodicity. In some examples, the periodicity may be referenced to a system frame number (SFN) and a sub-frame number of the DCI that initializes the SPS.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
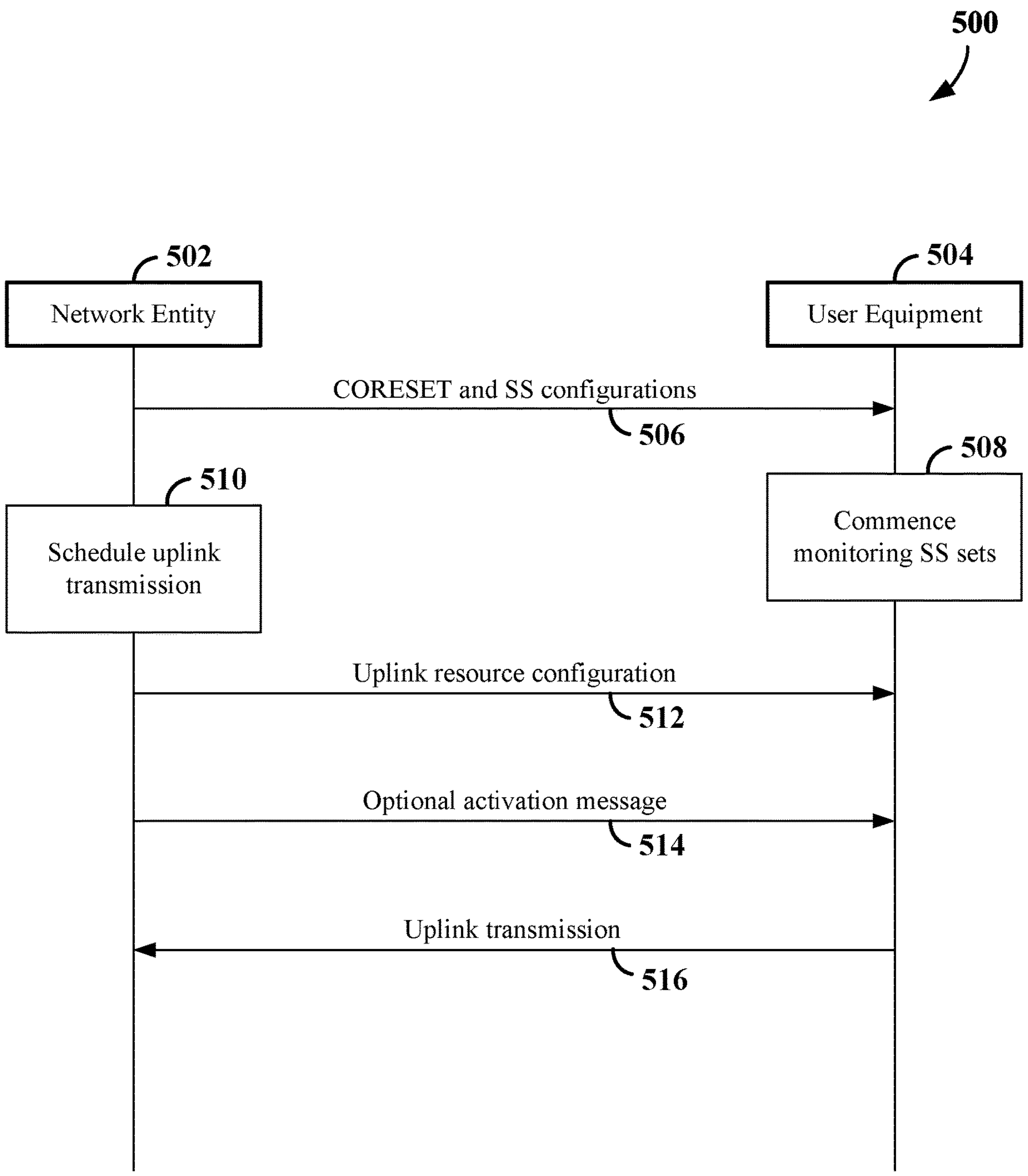
FIG. 5 is a signaling diagram illustrating an example of uplink transmission configuration-related signaling according to some aspects.

FIG. 5 is a signaling diagram 500 illustrating an example of uplink transmission configuration-related signaling in a wireless communication system including a network entity 502 and a user equipment (UE) 504. In some examples, the network entity 502 may correspond to any of the base stations, CUs, DUs, RUs, or scheduling entities shown in any of FIGS. 1-3, 6-10, 15, 17-19, and 24. In some examples, the UE 504 may correspond to any of the UEs or scheduled entities shown in any of FIGS. 1-3, 6-10, 13, and 15-20.

At 506 of FIG. 5, the network entity 502 transmits (e.g., via RRC messaging) CORESET and search space (SS) configurations that the UE 504 is to use for receiving information from the network entity 502. For example, a CORESET configuration for the UE may specify the RBs and the number of symbols for each CORESET configured for the UE 504. In addition, an SS configuration may specify, for each configured SS set, the associated CORESET, PDCCH monitoring occasion (MO) information, PDCCH candidates, and so on.

At 508, the UE 504 repeatedly monitors the configured SS sets to determine whether the network entity 502 has transmitted any messages to the UE 504. In some aspects, this may involve blind decoding for PDCCH candidates in a search space configured for the UE 504.

At 510, at some point in time, the network entity 502 configures an uplink (e.g., a PUSCH transmission or a PUCCH transmission) for the UE 504. Accordingly, at 512, the network entity 502 transmits a message to the UE 504, where the message may indicate a configured resource for the uplink transmission. As discussed above, the message may be a dynamic grant that dynamically configures an uplink resource, a configured grant (CG) that configures a set of resources (e.g., PUSCH occasions), or some other type of configuration message.

At optional 514, for a CG scenario, the network entity 502 transmits a message (e.g., a DCI) to the UE 504 to activate the CG resource.

At 516, the UE 504 transmits the uplink transmission to the network entity 502 via the configured resource.

Figure 6:
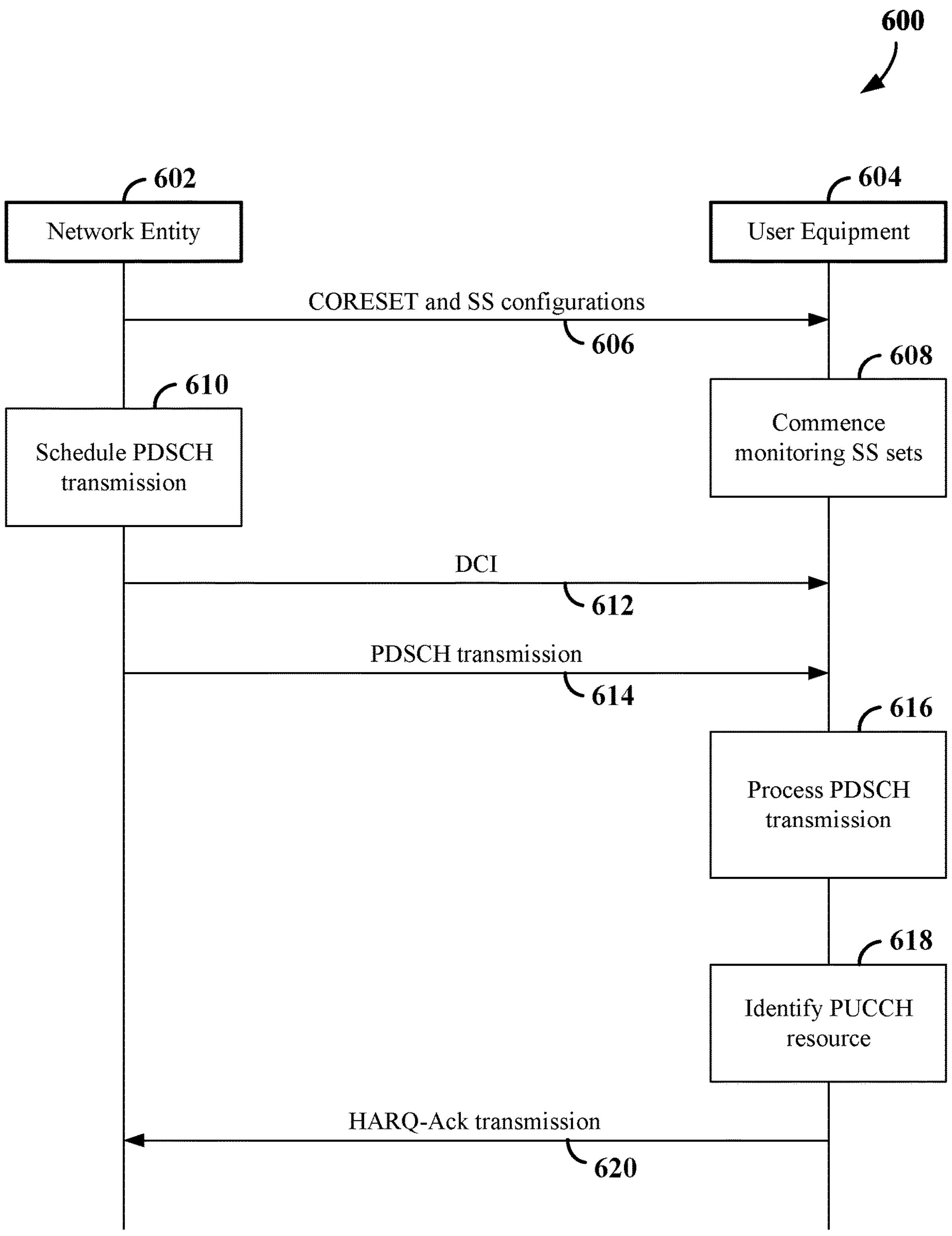
FIG. 6 is a signaling diagram illustrating an example of downlink transmission configuration-related signaling according to some aspects.

FIG. 6 is a signaling diagram 600 illustrating an example of PDSCH-related signaling in a wireless communication system including a network entity 602 and a user equipment (UE) 604. In some examples, the network entity 602 may correspond to any of the base stations, CUs, DUs, RUs, or scheduling entities shown in any of FIGS. 1-3, 5, 7-10, 15, 17-19, and 24. In some examples, the UE 604 may correspond to any of the UEs or scheduled entities shown in any of FIGS. 1-3, 5, 7-10, 13, and 15-20.

At 606 of FIG. 6, the network entity 602 transmits (e.g., via RRC messaging) CORESET and search space (SS) configurations that the UE 604 is to use for receiving information from the network entity 602. For example, a CORESET configuration for the UE may specify the RBs and the number of symbols for each CORESET configured for the UE 604. In addition, an SS configuration may specify, for each configured SS set, the associated CORESET, PDCCH monitoring occasion (MO) information, PDCCH candidates, and so on.

At 608, the UE 604 repeatedly monitors the configured SS sets to determine whether the network entity 602 has transmitted any messages to the UE 604. In some aspects, this may involve blind decoding for PDCCH candidates in a search space configured for the UE 604.

At 610, at some point in time, the network entity 602 schedules a PDSCH transmission for the UE 604. In some examples, the network entity 602 may schedule a PDSCH transmission and an associated PUCCH transmission (e.g., for a HARQ-Ack). Accordingly, at 612, the network entity 602 transmits a DCI to the UE 604, where the DCI may indicate a PDSCH resource for the PDSCH transmission and a PUCCH resource for a HARQ-Ack. At 614, the network entity 602 transmits the PDSCH transmission to the UE 604.

At 616, the UE 604 attempts to decode the PDSCH transmission and generates a HARQ-Ack to be sent to the network entity 602 to indicate whether the UE 604 successfully received the PDSCH transmission. Thus, at 618, the UE 604 will identify the PUCCH resource for sending the HARQ-Ack to the network entity 602 (e.g., based on information in the DCI received at 612). At 620, the UE 604 transmits the HARQ-Ack transmission on the PUCCH resource identified at 618.

Figure 7:
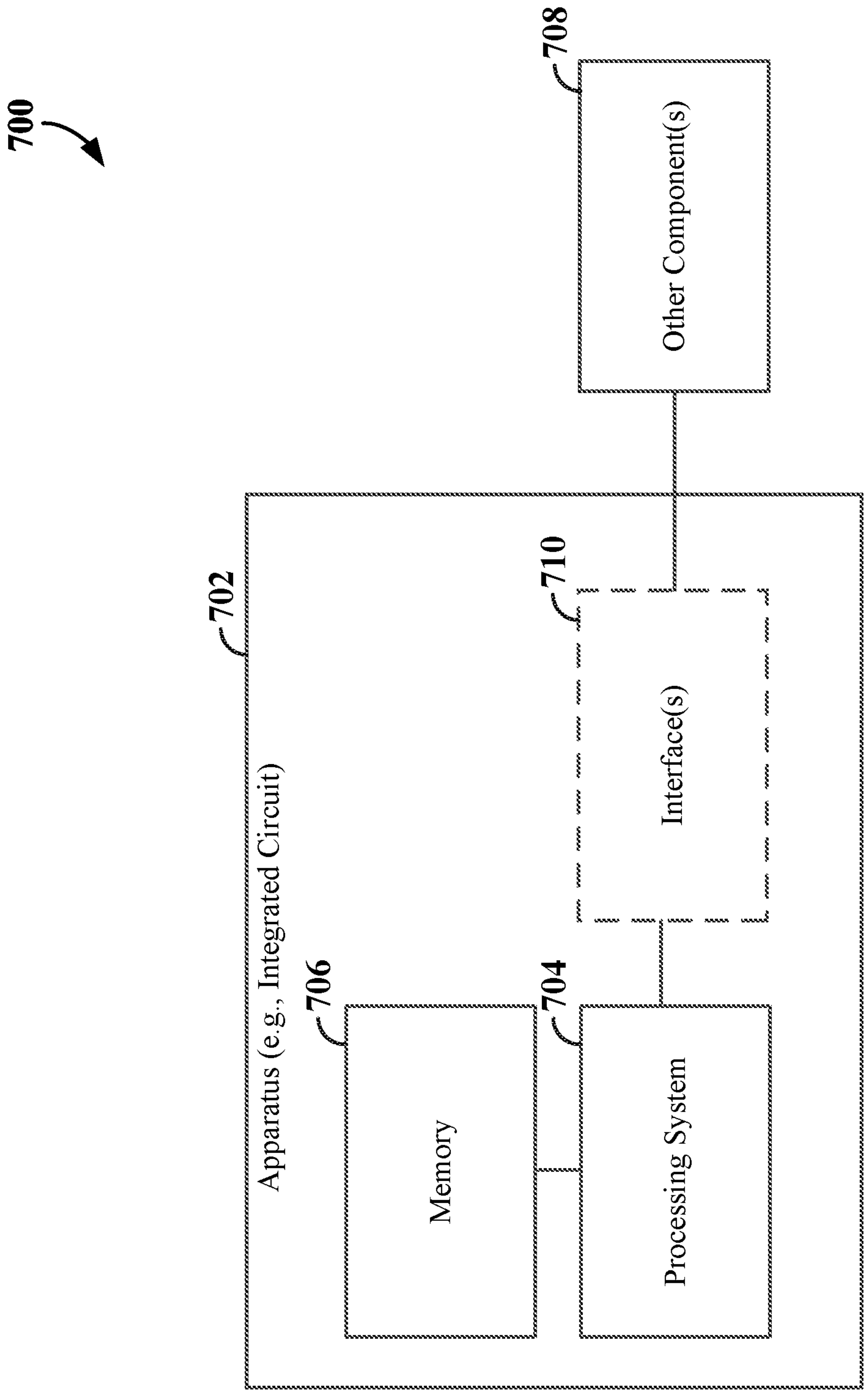
FIG. 7 is a schematic illustration of an example of a wireless node according to some aspects.

FIG. 7 illustrates an example wireless node 700 according to certain aspects of the disclosure. In some examples, the wireless node 700 may be a network entity, a UE, or some other type of node that utilizes wireless spectrum (e.g., the RF spectrum) to communicate with another node or entity. In some examples, the wireless node 700 may correspond to any of the apparatuses, UEs, scheduled entities, network entities, base stations (e.g., gNBs), scheduling entities, distributed units, control units, RAN nodes, or CN entities shown in any of FIGS. 1-3, 5-10, 13, 15-20, and 24.

The wireless node 700 includes an apparatus 702 (e.g., an integrated circuit, a chip set, a system-on-a-chip, etc.) and at least one other component 708 (e.g., a transceiver). In some aspects, the apparatus 702 may be configured to operate in the wireless node 700 and to perform one or more of the operations described herein. The apparatus 702 includes a processing system 704, and a memory 706 coupled to the processing system 704. Example implementations of the processing system 704 are provided herein. In some examples, the processing system 704 of FIG. 7 may correspond to the processing system 2014 of FIG. 20. In some examples, the processing system 704 of FIG. 7 may correspond to the processing system 2414 of FIG. 24.

The processing system includes at least one processor (not shown) and, optionally, at least one memory (e.g., in addition to the memory 706). The at least one memory and/or the memory 706 (which may itself include at least one memory) may store instructions (e.g., processor-executable code).

The at least one processor may execute the instructions to cause the wireless node 700 (e.g., a UE, a network entity, etc.) to perform any one or more of the functions described herein. In some examples, a single processor may perform all of the functions of a given operation (e.g., all of the functions associated with a particular method). In some examples, multiple processors may cooperate to perform all of the functions of a given operation. In some examples, a first processor may perform a first subset of the functions of a given operation, a second processor may perform a second subset of the functions, and so on (if applicable). In some examples, a first set of processors may cooperate to perform a first subset of the functions of a given operation, a second set of processors may cooperate to perform a second subset of the functions, and so on (if applicable). Other combinations are possible.

At least one memory may store the instructions for any one or more of the functions described herein. In some examples, a single memory may store the instructions for all of the functions of a given operation. In some examples, multiple memories may store the instructions for all of the functions of a given operation. In some examples, a first memory may store the instructions for a first subset of the functions of a given operation, a second memory may store the instructions for a second subset of the functions, and so on (if applicable). In some examples, a first set of memories may store the instructions for a first subset of the functions of a given operation, a second set of memories may store the instructions for a second subset of the functions, and so on (if applicable). Other combinations are possible.

The processing system 704 is generally adapted for processing, including the execution of such programming stored on the memory 706. For example, the memory 706 may store instructions that, when executed by the processing system 704, cause the processing system 704 to perform one or more of the operations described herein.

In some implementations, the apparatus 702 communicates with at least one other component (e.g., a component 708 external to the apparatus 702) of the wireless node 700. To this end, in some implementations, the apparatus 702 may include at least one interface 710 (e.g., a send and/or receive interface) coupled to the processing system 704 for outputting and/or obtaining information (e.g., received information, generated information, decoded information, messages, etc.) between the processing system 704 and the other component(s) 708. In some implementations, the interface 710 may include an interface bus, bus drivers, bus receivers, buffers, other suitable circuitry, or a combination thereof. In some implementations, the interface 710 may be configured to interface the apparatus 702 to one or more other components of the wireless node 700 (other components not shown in FIG. 7). In some examples, the interface 710 may be configured to interface the processing system 704 to a radio frequency (RF) front end (e.g., an RF transmitter and/or an RF receiver).

The apparatus 702 may communicate with other apparatuses in various ways. In some cases, the apparatus 702 may have an interface to provide (e.g., output, send, etc.) information for RF transmission. For example, the processing system 704 may output information, via a bus interface, to an RF front end for RF transmission. Similarly, the apparatus 702 may have an interface to obtain information that is received by another apparatus. For example, the processing system 704 may obtain information, via a bus interface, from an RF receiver that received the information via RF signaling. In some implementations, an interface may include multiple interfaces. For example, a bidirectional interface may include a first interface for obtaining and a second interface for outputting.

Figure 8:
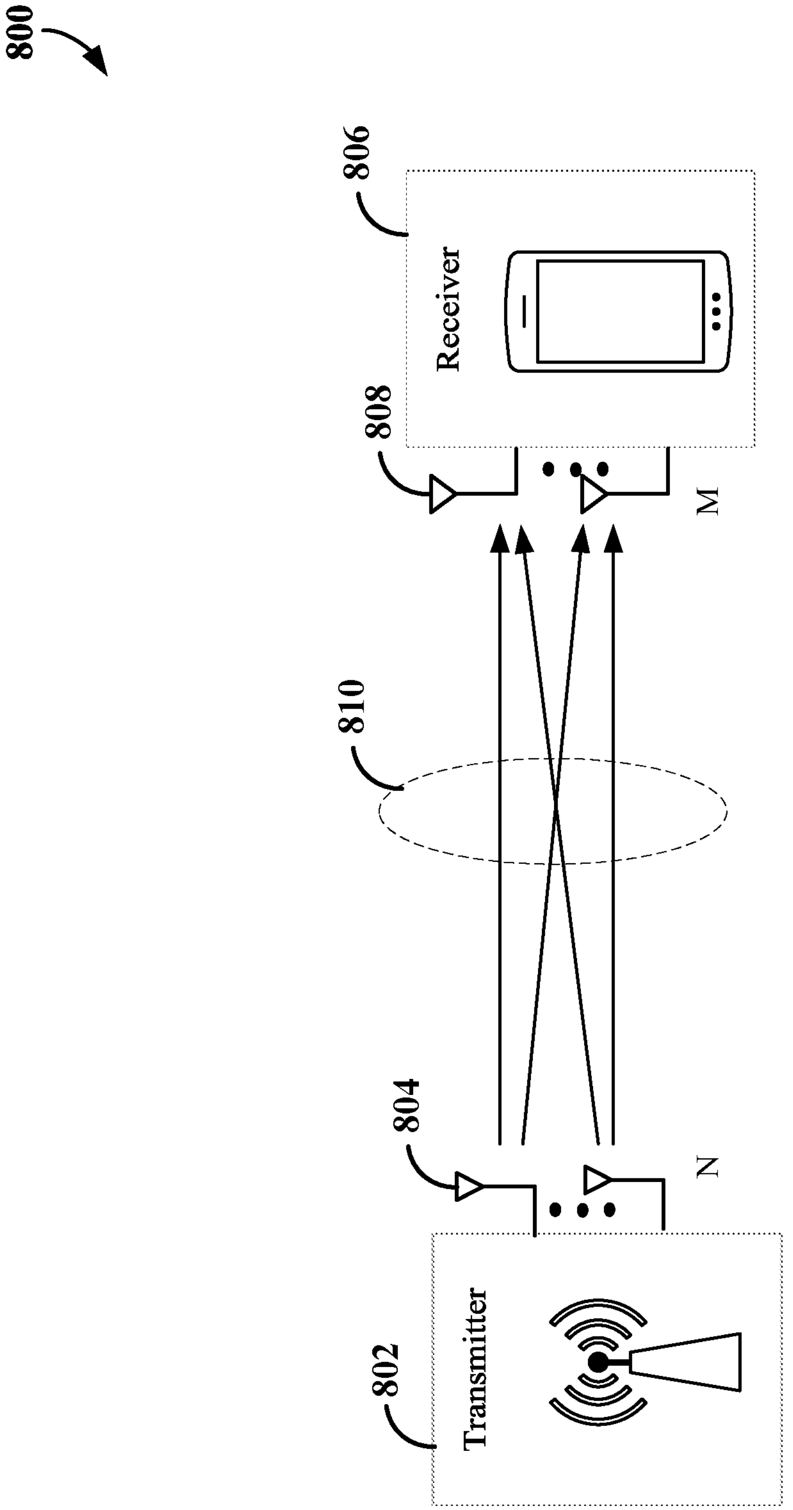
FIG. 8 is a block diagram illustrating an example of a wireless communication system supporting beamforming communication according to some aspects.

A scheduling entity (e.g., a network entity) and/or scheduled entity (e.g., a UE) may be configured for beamforming and/or multiple-input multiple-output (MIMO) technology. FIG. 8 illustrates an example of a wireless communication system 800 supporting beamforming and/or MIMO. In the wireless communication system 800, a transmitter 802 includes multiple transmit antennas 804 (e.g., N transmit antennas) and a receiver 806 includes multiple receive antennas 808 (e.g., M receive antennas). Thus, there are N×M signal paths 810 from the transmit antennas 804 to the receive antennas 808. Each of the transmitter 802 and the receiver 806 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the former being referred to as single-user MIMO (SU-MIMO) and the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the network entity to identify the source of each spatially precoded data stream.

The number of data streams or layers (e.g., MIMO layers) corresponds to the rank of the transmission. In general, the rank of the wireless communication system 800 (e.g., a MIMO system) is limited by the number of transmit antenna 804 or receive antennas 808, whichever is lower. In addition, the channel conditions at the UE, as well as other considerations, such as the available resources at the network entity, may also affect the transmission rank. For example, the rank (and therefore, the number of data streams) assigned to a particular UE on the downlink may be determined based on the rank indicator (RI) transmitted from the UE to the network entity. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The network entity may use the RI, along with resource information (e.g., the available resources and amount of data to be scheduled for the UE), to assign a transmission rank to the UE.

In one example (e.g., FIG. 8), a rank-2 spatial multiplexing transmission on a 2×2 MIMO antenna configuration will transmit one data stream from each transmit antenna 804. Each data stream reaches each receive antenna 808 along a different signal path 810. The receiver 806 may then reconstruct the data streams using the received signals from each receive antenna 808.

Beamforming is a signal processing technique that may be used at the transmitter 802 or the receiver 806 to shape or steer an antenna beam (e.g., a transmit beam or receive beam) along a spatial path between the transmitter 802 and the receiver 806. Beamforming may be achieved by combining the signals communicated via the transmit antennas 804 or the receive antennas 808 (e.g., antenna elements of an antenna array module) such that some of the signals experience constructive interference while others experience destructive interference. To create the desired constructive/destructive interference, the transmitter 802 or the receiver 806 may apply amplitude and/or phase offsets to signals transmitted from each of the transmit antennas 804 or received by each of the receive antenna 808.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A network entity (e.g., gNB) may generally be capable of communicating with UEs using beams (e.g., downlink transmit beams) of varying beam widths. For example, a network entity may be configured to utilize a wider beam when communicating with a UE that is in motion and a narrower beam when communicating with a UE that is stationary.

Figure 9:
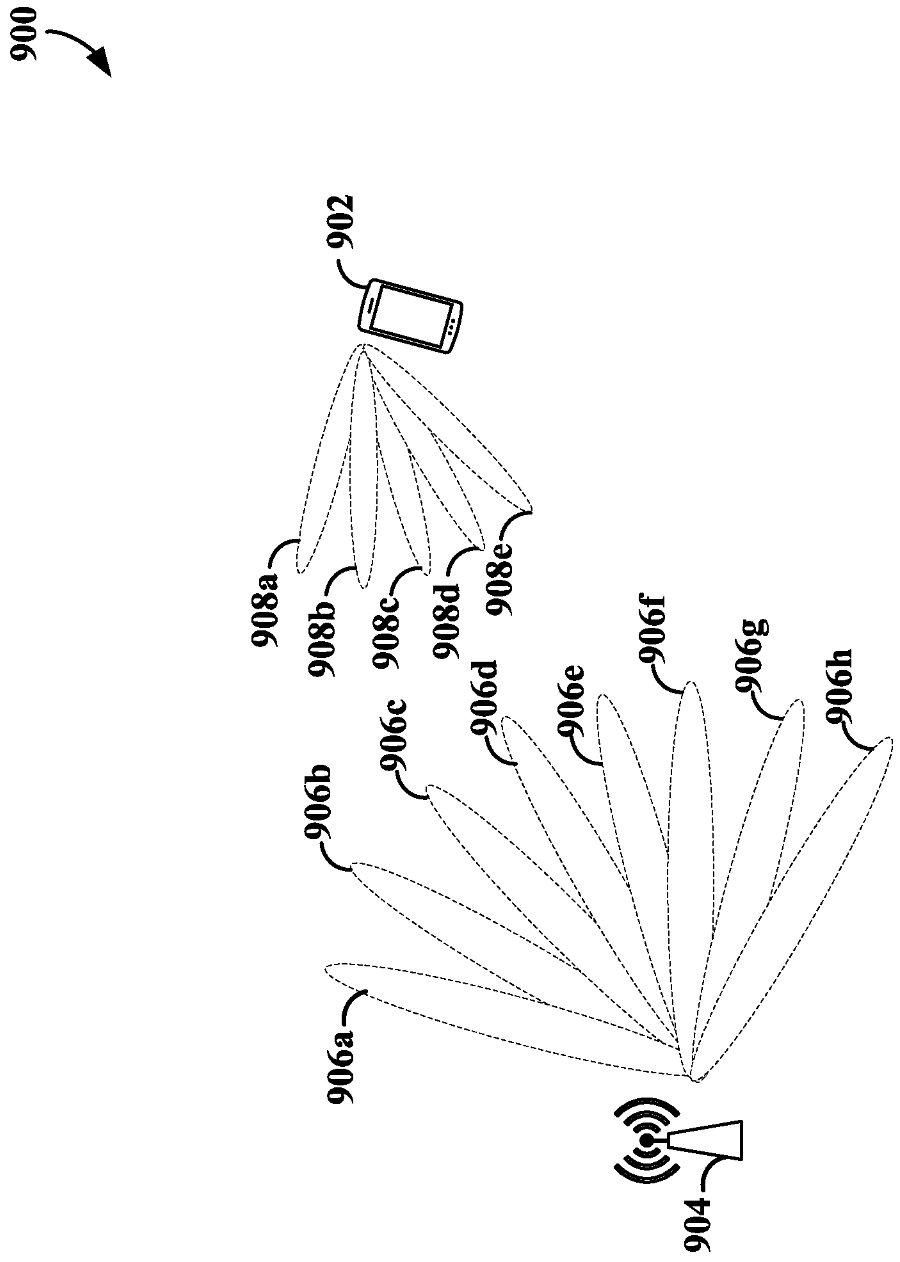
FIG. 9 is a diagram illustrating an example of communication between a radio access network (RAN) node and a wireless communication device using beamforming according to some aspects.

FIG. 9 is a diagram illustrating communication between a network entity 904 and a UE 902 using beamformed signals according to some aspects. The network entity 904 may be any of the network entities (e.g., gNBs), CUs, DUs, RUs, or scheduling entities illustrated in any of FIGS. 1-3, 5-8, 10, 15, 17-19, and 24. The UE 902 may be any of the UEs or scheduled entities illustrated in any of in any of FIGS. 1-3, 5-8, 10, 13, and 15-20.

The network entity 904 may generally be capable of communicating with the UE 902 using one or more transmit beams, and the UE 902 may further be capable of communicating with the network entity 904 using one or more receive beams. As used herein, the term transmit beam refers to a beam on the network entity 904 that may be utilized for downlink or uplink communication with the UE 902. In addition, the term receive beam refers to a beam on the UE 902 that may be utilized for downlink or uplink communication with the network entity 904.

In the example shown in FIG. 9, the network entity 904 is configured to generate a plurality of transmit beams 906*a*-906*h*, each associated with a different spatial direction. In addition, the UE 902 is configured to generate a plurality of receive beams 908*a*-908*e*, each associated with a different spatial direction. It should be noted that while some beams are illustrated as adjacent to one another, such an arrangement may be different in different aspects. For example, transmit beams 906*a*-906*h* transmitted during the same symbol might not be adjacent to one another. In some examples, the network entity 904 and the UE 902 may each transmit more or fewer beams distributed in all directions (e.g., 360 degrees) and in three-dimensions. In addition, the transmit beams 906*a*-906*h* may include beams of varying beam width. For example, the network entity 904 may transmit certain signals (e.g., SSBs) on wider beams and other signals (e.g., CSI-RSs) on narrower beams.

The network entity 904 and the UE 902 may select one or more transmit beams 906*a*-906*h* on the network entity 904 and one or more receive beams 908*a*-908*e* on the UE 902 for communication of uplink and downlink signals therebetween using a beam management procedure. In one example, during initial cell acquisition, the UE 902 may perform a P1 beam management procedure to scan the plurality of transmit beams 906*a*-906*h* on the plurality of receive beams 908*a*-908*e* to select a beam pair link (e.g., one of the transmit beams 906*a*-906*h* and one of the receive beams 908*a*-908*e*) for a physical random access channel (PRACH) procedure for initial access to the cell. For example, periodic SSB beam sweeping may be implemented on the network entity 904 at certain intervals (e.g., based on the SSB periodicity). Thus, the network entity 904 may be configured to sweep or transmit an SSB on each of a plurality of wider transmit beams 906*a*-906*h*. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the network entity 904 and the UE 902 may perform a P2 beam management procedure for beam refinement. For example, the network entity 904 may be configured to sweep or transmit a CSI-RS on each of a plurality of narrower transmit beams 906*a*-906*h*. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by a gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 902 is configured to scan the plurality of CSI-RS transmit beams 906*a*-906*h* on the plurality of receive beams 908*a*-908*e*. The UE 902 then performs beam measurements (e.g., RSRP, SINR, etc.) of the received CSI-RSs on each of the receive beams 908*a*-908*e* to determine the respective beam quality of each of the CSI-RS transmit beams 906*a*-906*h* as measured on each of the receive beams 908*a*-908*e*.

The UE 902 can then generate and transmit a Layer 1 (L1) measurement report, including the respective beam index (e.g., CSI-RS resource indicator (CRI)) and beam measurement (e.g., RSRP) of one or more of the CSI-RS transmit beams 906*a*-906*h* on one or more of the receive beams 908*a*-908*e* to the network entity 904. The network entity 904 may then select one or more CSI-RS transmit beams on which to transmit unicast downlink control information and/or user data traffic to the UE 902. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 902 may further select a corresponding receive beam on the UE 902 for each selected serving CSI-RS transmit beam to form a respective downlink beam pair link (BPL) for each selected serving CSI-RS transmit beam. For example, the UE 902 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, the network entity 904 may configure the UE 902 to perform SSB beam measurements and provide an L1 measurement report containing beam measurements of SSB transmit beams 906*a*-906*h*. For example, the network entity 904 may configure the UE 902 to perform SSB beam measurements and/or CSI-RS beam measurements for beam failure detection (BRD), beam failure recovery (BFR), cell reselection, beam tracking (e.g., for a mobile UE 902 and/or network entity 904), or some other beam optimization purpose.

In addition, when the channel is reciprocal, the transmit and receive beams may be selected using an uplink beam management scheme. In an example, the UE 902 may be configured to sweep or transmit on each of a plurality of receive beams 908*a*-908*e*. For example, the UE 902 may transmit an SRS on each beam in the different beam directions. In addition, the network entity 904 may be configured to receive the uplink beam reference signals on a plurality of transmit beams 906*a*-906*h*. The network entity 904 then performs beam measurements (e.g., RSRP, SINR, etc.) of the beam reference signals on each of the transmit beams 906*a*-906*h* to determine the respective beam quality of each of the receive beams 908*a*-908*e* as measured on each of the transmit beams 906*a*-906*h*.

The network entity 904 may then select one or more transmit beams on which to transmit unicast downlink control information and/or user data traffic to the UE 902. In some examples, the selected transmit beam(s) has (have) the highest RSRP. The UE 902 may then select a corresponding receive beam for each selected serving transmit beam to form a respective beam pair link (BPL) for each selected serving transmit beam, using, for example, a P3 beam management procedure, as described above.

In one example, a single transmit beam (e.g., the transmit beam 906*d*) on the network entity 904 and a single receive beam (e.g., the receive beam 908*c*) on the UE 902 may form a single BPL used for communication between the network entity 904 and the UE 902. In another example, multiple transmit beams (e.g., transmit beams 906*c*, 906*d*, and 906*e*) on the network entity 904 and a single receive beam (e.g., receive beam 908*c*) on the UE 902 may form respective BPLs used for communication between the network entity 904 and the UE 902. In another example, multiple transmit beams (e.g., transmit beams 906*c*, 906*d*, and 906*e*) on the network entity 904 and multiple receive beams (e.g., receive beams 908*c* and 908*d*) on the UE 902 may form multiple BPLs used for communication between the network entity 904 and the UE 902. In this example, a first BPL may include the transmit beam 906*c* and the receive beam 908*c*, a second BPL may include the transmit beam 908*d* and the receive beam 908*c*, and a third BPL may include the transmit beam 908*e* and the receive beam 908*d*.

In some examples, to select one or more downlink transmit beams and one or more downlink receive beams for communication with a UE 902, the network entity 904 may transmit a reference signal, such as an SSB or CSI-RS, on each of a plurality of downlink transmit beams in a beam-sweeping manner. The UE 902 may measure the reference signal received power (RSRP) on each of the downlink transmit beams using one or more downlink receive beams on the UE 902 and transmit a beam measurement report to the network entity 904 indicating the RSRP of each of the measured downlink transmit beams. The network entity 904 may then select one or more serving downlink beams (e.g., downlink transmit beams and downlink receive beams) for communication with the UE 902 based on the beam measurement report. The resulting selected downlink transmit beam and downlink receive beam may form a downlink beam pair link. In other examples, when the channel is reciprocal, the network entity 904 may derive the particular downlink beam(s) to communicate with the UE 902 based on uplink measurements of one or more uplink reference signals, such as sounding reference signals (SRSs).

In some examples, uplink beams (e.g., uplink transmit beam(s) at the UE 902 and uplink receive beam(s) at the network entity 904) may be selected by measuring the RSRP of received uplink reference signals (e.g., SRSs) or downlink reference signals (e.g., SSBs or CSI-RSs) during an uplink or downlink beam sweep. For example, the network entity 904 may determine the uplink beams either by uplink beam management via an SRS beam sweep with measurement at the network entity 904 or by downlink beam management via an SSB/CSI-RS beam sweep with measurement at the UE 902. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

In some examples, transmissions by one UE may result in cross-link interference (CLI) at a nearby UE. CLI may arise between nearby UEs that are located at corresponding cell boundaries. CLI may also arise between UEs within the same cell if the network configures different TDD UL DL slot formats to enable better frequency reuse by gNB full-duplex. The network uses the level of the CLI (e.g., reported by a UE) to balance the DL capacity loss due to inter-UE interference and capacity enhancement by frequency reuse.

Figure 10:
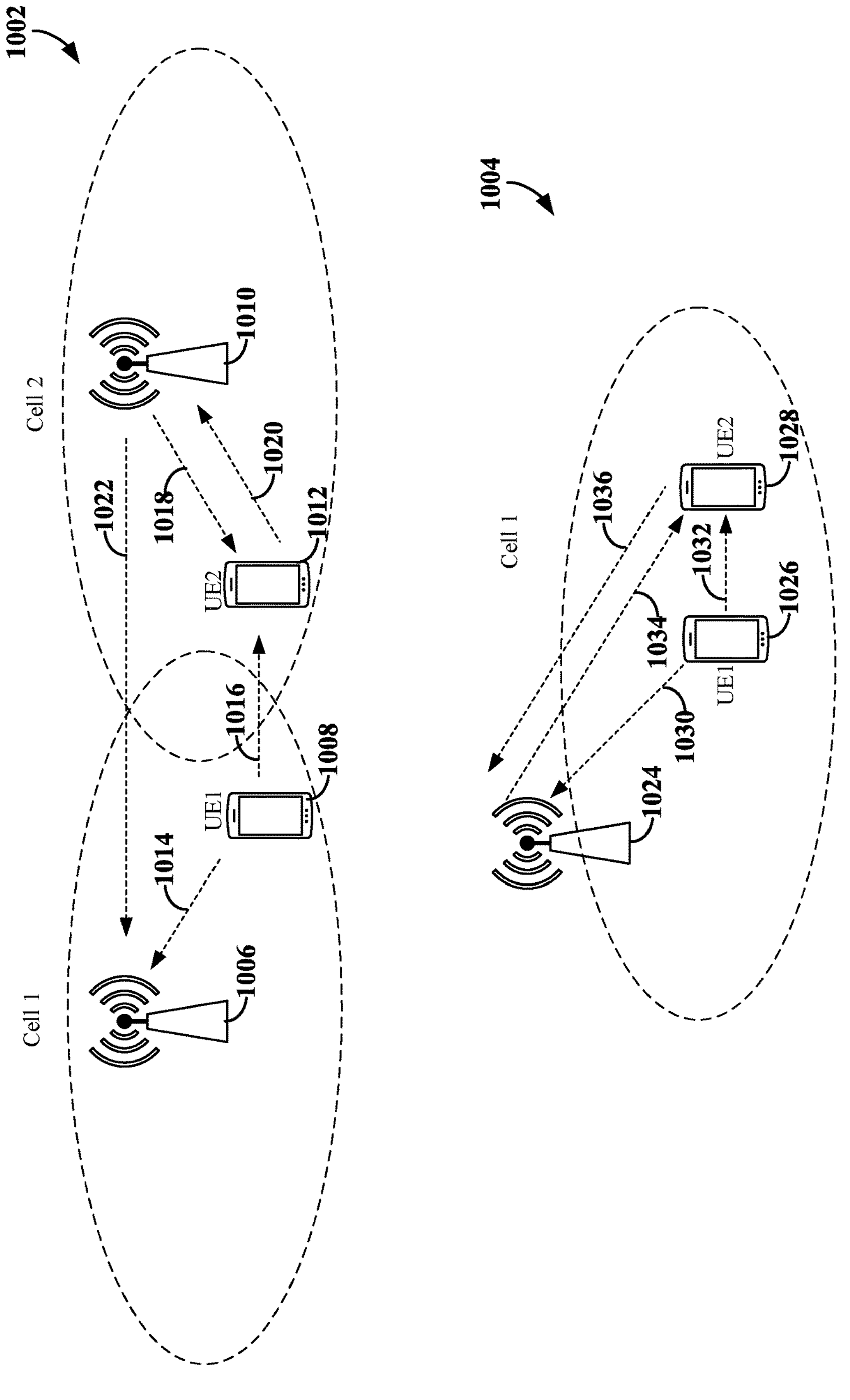
FIG. 10 is a diagram illustrating examples of cross-link interference-related signaling according to some aspects.

FIG. 10 illustrates two CLI examples. A first CLI example 1002 involves CLI between cells. A second CLI example 1004 involves CLI within a cell. FIG. 10 also illustrates how a CLI framework allows a first UE to receive information from a second UE, although the information to be received is not intended for the first UE.

In the first CLI example 1002, a first network entity 1006 communicates with a first UE 1008 within a first cell (cell 1) and a second network entity 1010 communicates with a second UE 1012 within a second cell (cell 2). In this case, a transmission 1014 by the first UE 1008 to the first network entity 1006 may cause CLI 1016 at the second UE 1012 that interferes with reception at the second UE 1012. For example, the received signal quality of a signal 1018 from the second network entity 1010 may be degraded at the second UE 1012.

To address this issue, the first network entity 1006 and the second network entity 1010 may cooperate to enable the second UE 1012 to measure the CLI 1016 (e.g., during a period of time when the second UE 1012 is not receiving active data). For example, the first network entity 1006 may configure the first UE 1008 to transmit an SRS on a measurement resource (e.g., a channel measurement resource (CMR) and/or an interference measurement resource (IMR)). In addition, the second network entity 1010 may configure the second UE 1012 to monitor the configured resource for the SRS transmitted by the first UE 1008 and to report the measurement information to the second network entity 1010. In this way, the first network entity 1006 and/or the second network entity 1010 may adjust their UE scheduling to mitigate (e.g., reduce) the CLI 1016.

In the second CLI example 1004, a network entity 1024 communicates with a first UE 1026 and a second UE 1028 within a cell (cell 1). In this case, a transmission 1030 by the first UE 1026 to the network entity 1024 may cause CLI 1032 at the second UE 1028 that interferes with reception at the second UE 1028. For example, the received signal quality of a signal 1034 from the network entity 1024 may be degraded at the second UE 1028.

To address this issue, the network entity 1024 may configure the second UE 1028 to measure the CLI 1032 (e.g., during a period of time when the second UE 1028 is not receiving active data). For example, the network entity 1024 may configure the first UE 1026 to transmit an SRS on a measurement resource (e.g., a CMR and/or an IMR). In addition, the network entity 1024 may configure the second UE 1028 to monitor the configured resource for the SRS transmitted by the first UE 1026 and to report the measurement information to the network entity 1024. In this way, the network entity 1024 may adjust its UE scheduling to mitigate (e.g., reduce) the CLI 1032.

3GPP 6G and potentially other communication systems may employ so-called massive connectivity. For example, for use cases such as industrial sensors, utility meters, in-home networks, wearable devices, asset trackers, health monitors, video surveillance, and so on, connection densities may exceed 10 million device per square kilometer.

Figure 11:
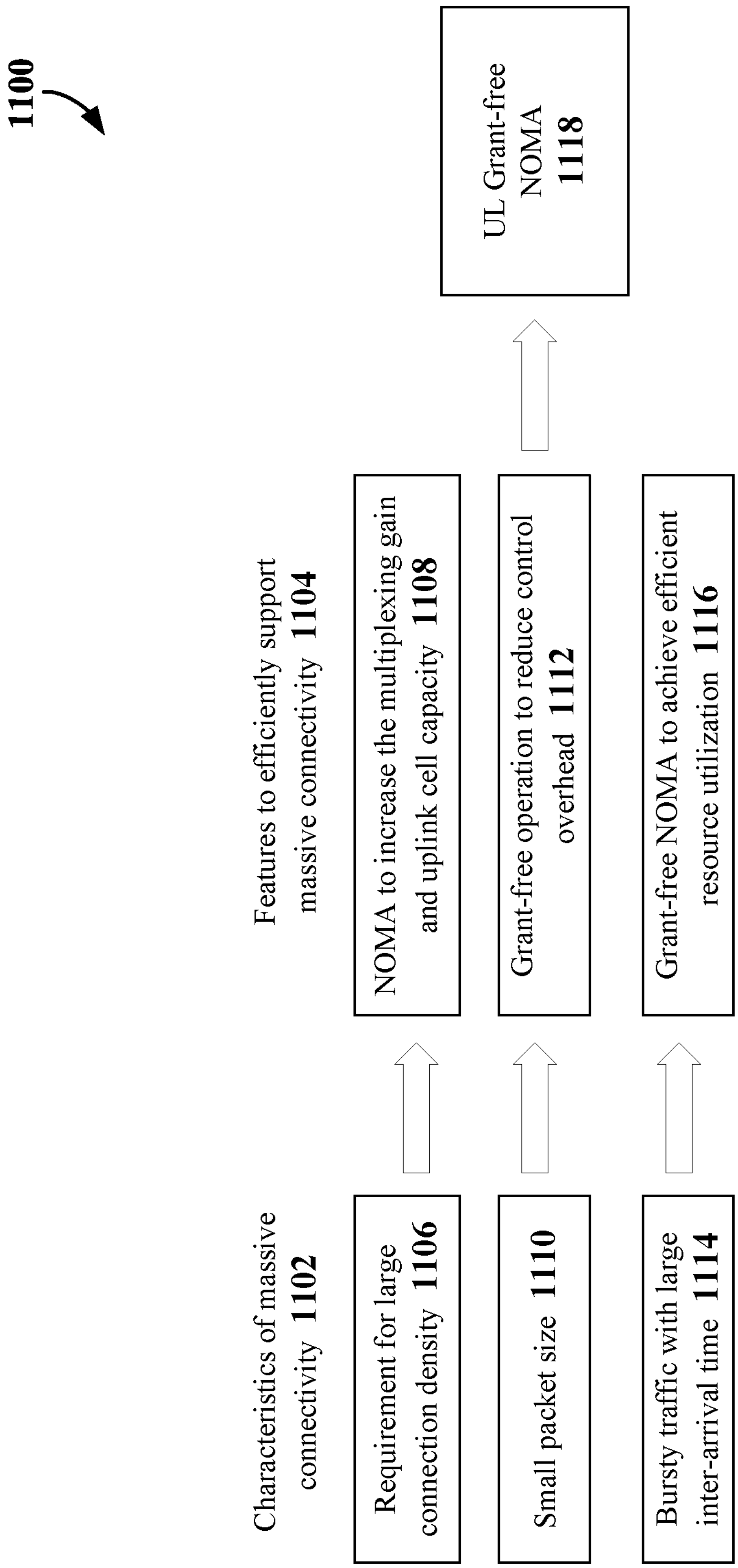
FIG. 11 is a block diagram illustrating an example of multiple access techniques according to some aspects.

FIG. 11 illustrates an example 1100 of several potential characteristics of massive connectivity 1102 and features to efficiently support such massive connectivity 1104. As a first example, to support a large connection density 1106, non-orthogonal multiple access (NOMA) 1108 may be used to increase the multiplexing gain and uplink cell capability. As a second example, to support a small packet size 1110, grant-free operation 1112 may be used to reduce control overhead. As a third example, to support bursty traffic with a large inter-arrival time, grant-free NOMA 1116 may be used to achieve efficient resource utilization. The disclosure relates in some aspects to techniques that may be used, for example, in an uplink grant-free NOMA framework 1118, and other frameworks (e.g., rate-splitting).

SF1-NOMA is a potential candidate scheme for 6G grant-free NOMA. Relatively good BLER performance may be achieved compared to spreading-based NOMA for a small number of users. A relatively low resource collision rate may be achieved if a relatively large multiple access (MA) signature pool is used. In some examples, UE-specific bit scrambling may be used as the MA signature.

Figure 12:
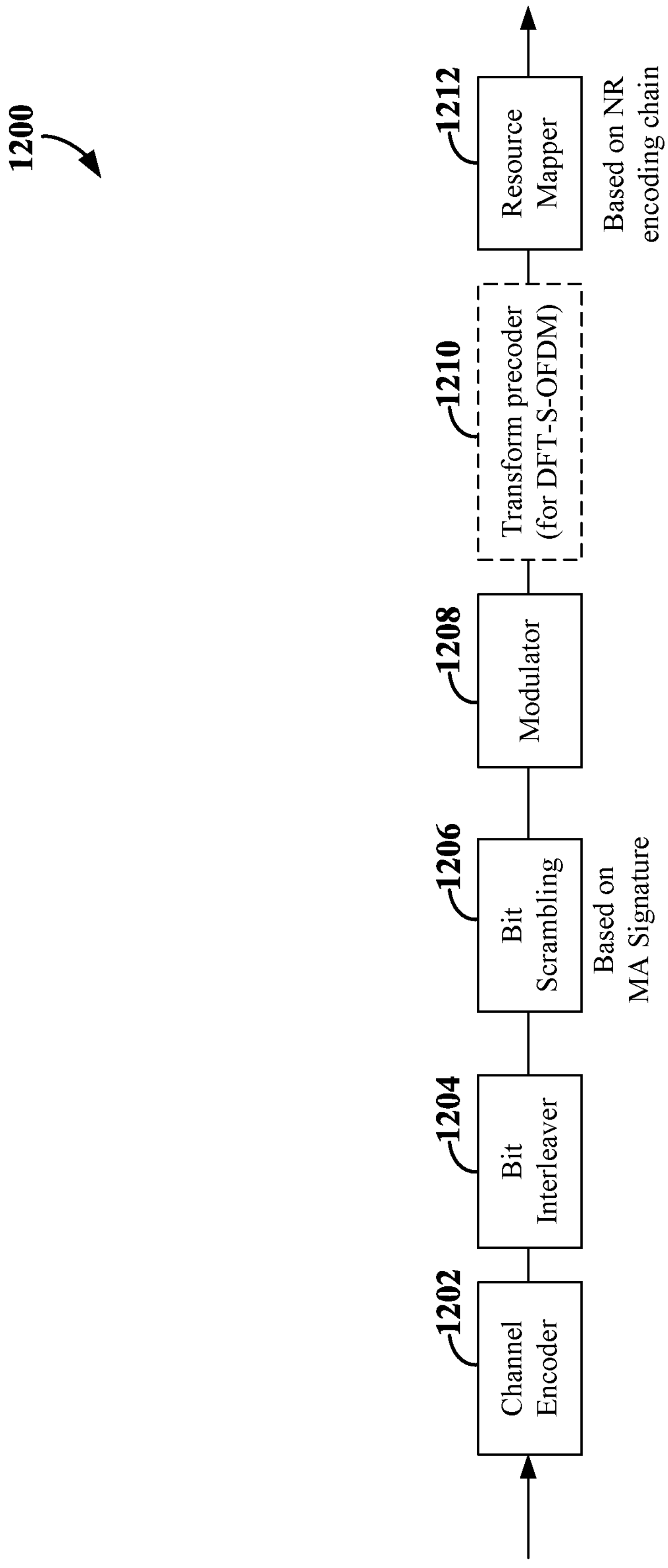
FIG. 12 is a block diagram illustrating an example of non-orthogonal multiple access-related components at a transmitter according to some aspects.

FIG. 12 illustrates an example of a NOMA transmit chain 1200. Input data is encoded by a channel encoder 1202, interleaved by a bit interleaver 1204, scrambled by a bit scrambler 1206 (based on the MA signature), modulated by a modulator 1208, optionally transformed by a transform precoder 1210, and mapped by a resource mapper 1212.

An example of a collision analysis for a 2-step random access channel (RACH) for grant-free NOMA follows. A collision may happen if multiple UEs choose non-differentiable (e.g., the same) resources under a grant-free setup. The collision rate should be smaller than the required BLER. Equation 1 illustrates an examples of a per-user collision rate.

$$P(col_{user}) = 1 - \left(1 - \frac{1}{S}\right)^{M-1} \qquad \text{EQUATION 1}$$

In Equation 1, the parameter S corresponds to the number of differentiable resources. In some examples, S=min(the number of associated PRACH sequences, the number of DMRS ports, the number of MA signatures). The parameter M corresponds to the number of simultaneously transmitting users.

To keep the collision rate less than 10%, one may increase one or more of: S: number of PRACH sequences, number of MA signatures, number of DMRS ports. In some examples, M≤6 to keep the number of simultaneous users smaller than or equal to 6. Table 1 illustrates several examples of per-user collision rates for different values of M and S.

TABLE 1

| | Per-user collision rate | | | | |
|---|---|---|---|---|---|
| M | S = 6 | S = 12 | S = 24 | S = 48 | S = 64 |
| 2 | 0.17 | 0.08 | 0.04 | 0.02 | 0.016 |
| 4 | 0.42 | 0.23 | 0.12 | 0.061 | 0.046 |
| 6 | 0.6 | 0.35 | 0.19 | 0.10 | 0.076 |
| 8 | 0.72 | 0.46 | 0.26 | 0.14 | 0.10 |

In some scenarios (e.g., for a broadcast channel), rate-splitting may be used to achieve a larger degree of freedom and/or capacity than may otherwise be achieved using non-rate-splitting techniques. Consequently, rate-splitting may be used in 5G, 5G-advanced, 6G, and/or other networks to improve communication performance. In rate-splitting, the messages of individual users (e.g., messages destined for different UEs) are split into common and private parts for transmission. Here, the common part may include common information that is being sent to all users (e.g., a broadcast message). Conversely, the private part may include information that is unique to the corresponding UE.

Figure 13:
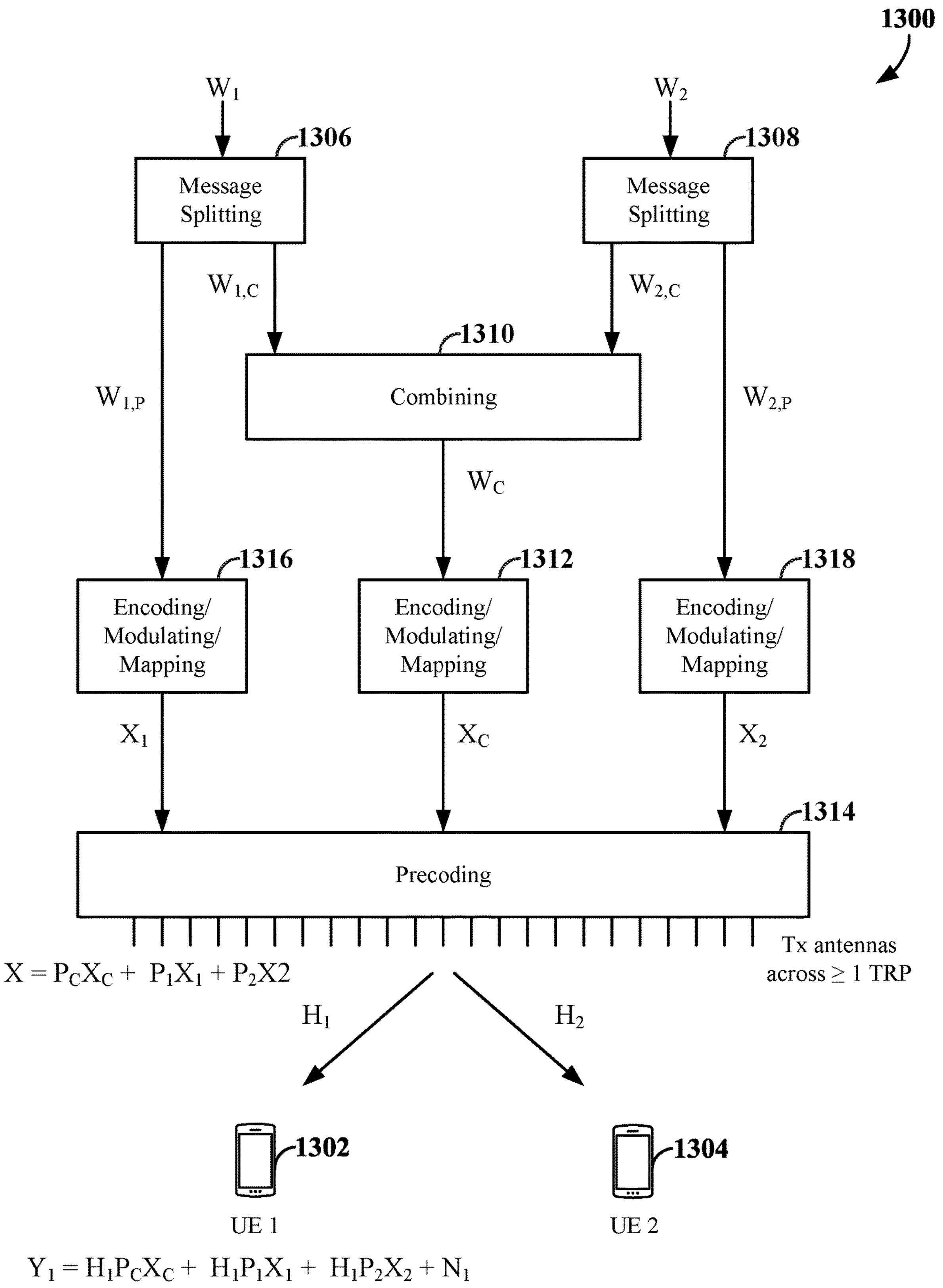
FIG. 13 is a diagram illustrating an example of rate-splitting-related operations at a transmitter according to some aspects.

FIG. 13 illustrates an example of rate-splitting operations 1300 that may be performed at a transmitter (e.g., of a network entity) that is sending a first message $W_1$ to a first UE 1302 and a second message $W_2$ to a second UE 1304. A message splitter 1306 splits the first message $W_1$ into a common part $W_{1,C}$ and a private part $W_{1,P}$. Similarly, a message splitter 1308 splits the second message $W_2$ into a common part $W_{2,C}$ and a private part $W_{2,P}$.

A combiner 1310 combines the common parts of the individual messages into a common message $W_c$. An encoder/modulator/mapper 1312 encodes, modulates, and maps (e.g., to one or more layers) the common message $W_c$ to $X_c$. $X_c$ may be referred to as a common stream, and can have one or more layers. A precoder 1314 precodes the common stream $X_c$ by $P_c$, and the resulting signal is transmitted by transmit (Tx) antennas (e.g., from one TRP/gNB, or from multiple TRPs in a coordinated multi-point (CoMP) scenario).

The private part of individual messages are separately encoded and modulated to private streams for the corresponding UE. These private streams are then precoded and transmitted by the Tx antennas (e.g., from one TRP/gNB, or from multiple TRPs in a CoMP scenario).

In the example of FIG. 13, an encoder/modulator/mapper 1316 encodes, modulates, and maps (e.g., to one or more layers) the private part of the individual message $W_{1,P}$ to a private stream $X_1$. The precoder 1314 precodes the private stream $X_1$ by $P_1$, and the resulting signal is transmitted by the Tx antennas.

Similarly, an encoder/modulator/mapper 1318 encodes, modulates, and maps (e.g., to one or more layers) the private part of the individual message $W_{2,P}$ to a private stream $X_2$. The precoder 1314 precodes the private stream $X_2$ by $P_2$, and the resulting signal is transmitted by the Tx antennas.

As indicated in FIG. 13, the signal transmitted by the Tx antennas may be represented as $X=P_CX_C+P_1X_1+P_2X_2$. This transmitted signal is subjected to a first channel $H_1$ associated with the path from the Tx antennas to the first UE 1302 and a second channel $H_2$ associated with the path from the Tx antennas to the second UE 1304. The signal received at the first UE 1302 may be represented as $Y_1=H_1P_CX_C+H_1P_1X_1+H_1P_2X_2+N_1$, where $N_1$ represents the noise associated with the first channel $H_1$. The signal received at the second UE 1304 may be represented as $Y_2=H_2P_CX_C+H_2P_1X_1+H_2P_2X_2+N_2$, where $N_2$ represents the noise associated with the second channel $H_2$.

At the receiver side, in some examples, each UE may decode the common message first. This approach may serve two purposes. First, some part of the individual message for each UE ($W_{1,C}$ and $W_{2,C}$, respectively) is embedded in the common message ($W_c$), which is the data intended for the corresponding UE. Thus, the decoding of the common message recovers this data. Second, the decoding of the common message may be used in conjunction with successive interference cancelation to decode the private message.

Figure 14:
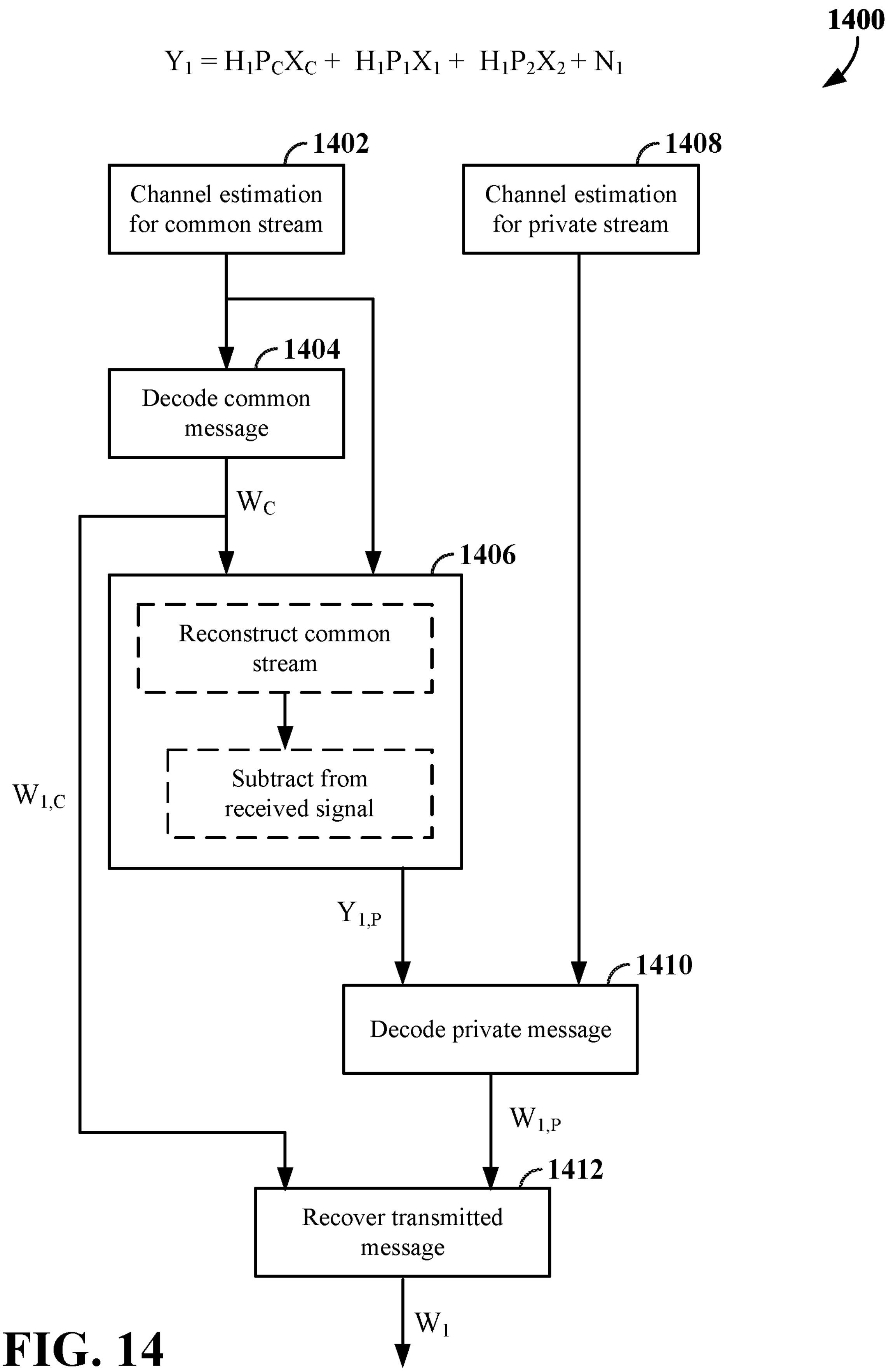
FIG. 14 is a diagram illustrating an example of rate-splitting-related operations at a receiver according to some aspects.

FIG. 14 illustrates an example of operations 1400 that may be performed at a receiver (e.g., of the first UE 1302) that receives the signal $Y_1$. A first channel estimator 1402 estimates the effective channel corresponding to the common stream $H_1P_c$. A decoder 1404 decodes the common message $W_C$ from the received signal $Y_1$ based on this channel estimation. An encoder 1406 re-encodes the common message $W_c$ to the common stream $X_c$, multiplies the result by the estimated effective channel, and subtracts this result from received signal $Y_1$. Assuming ideal channel estimation and successful decoding, $Y_{1,p}=Y_1-H_1P_CX_C=H_1P_1X_1+H_1P_2X_2+N_1$.

A second channel estimator 1408 estimates the effective channel corresponding to the private stream $H_1P_1$. A decoder 1410 decodes the private message using this channel estimation and $Y_{1,p}$. The first UE 1302 may thereby recover the original signal W1 based on the common part $W_{1,C}$ and the private part $W_{1,P}$ as represented by block 1412. It may thus be observed that having an accurate channel estimation of the common stream $H_1P_c$ is important in a rate-splitting scheme. An accurate channel estimation not only helps to increase the chance of decoding the common message successfully, but also assists in reconstructing the private message via successive interference cancelation.

In a rate-splitting scheme as discussed above, it may be seen that a single TB may be split into two streams: a common stream and a private stream. In some aspects, these streams may be treated as two TBs, which could result in separate DCIs, with associated overhead, being used to schedule the transmission of the streams. For example, a network entity may transmit a first DCI that includes the transmission parameters that the UE is to use to decode a common message sent by the network entity. In addition, the network entity may transmit a second DCI that includes the transmission parameters that the UE is to use to decode a private message sent by the network entity.

The disclosure relates in some aspects to techniques for enabling NOMA, rate splitting, or ordered access operation on grant-free allocations and/or for enabling future 6G optimized resource utilization schemes. In some examples, a network entity (e.g., gNB) can configure a set of frequency resources, or configured grants dedicated for shared utilization where many UEs can use them at the same time. Because the UEs may be used in a NOMA scheme, rate splitting scheme, or priority in use (assuming the network will assign the same resources to at least two UEs), the UEs can indicate to each other whether they will be skipping or using configured resources (e.g., PUSCH occasions) on the UL.

In some examples, multiple PUSCH occasions may be scheduled for one or more UEs. For example, certain types of traffic (e.g., extended-reality (XR) traffic) may require more uplink resources than can be provided by a single PUSCH occasion.

A UE may skip a given UL occasion due to, for example, one or more of: lack of traffic, lack of energy (e.g., battery power), lack of transmit power, radio resource management (RRM) measurements, UL cancellation by the network, or being engaged with other tasks (e.g., if the UE is helping the network by relaying or in ambient IoT processing). The network may pack or assign multiple UEs to the same resources for MU-MIMO, NOMA, rate splitting, in an ordered access manner, etc.

When a UE skips, cancels, or cannot use an occasion, the UE can indicate this to the other UEs. In some examples, the indication from one UE to another UE could include which skipping occasion or occasions apply, and which resources are to be used and/or skipped within an occasion. Here, since the nearby UEs can obtain this indication directly from the UE that sent the indication, a nearby UE may have sufficient time to reconfigure how it will use that resource. In contrast, if the indication was passed to a network entity and then forwarded to the UEs, due to processing and signaling delays, a UE might not have sufficient time to use the occasion or reconfigure how it will use the occasion.

In some examples, UEs can use a CLI framework to indicate skipping of UL occasions or resources. In various examples, this skipping may be due to traffic conditions, lack of energy (e.g., expected lack of energy), a cancellation indication from the network, or some other cause.

CLI or so-called inter-UE interference has been studied for the scenario of a semi-static TDD UL DL slot format difference between adjacent cells. The slot format is a periodic slot pattern consisting of slots each with DL, UL, or flexible symbols or mixture of different types of symbols.

CLI measurement may be specified to characterize the long-term interference between nearby UEs around the cell boundary. In some examples, this involves dynamic measurement of the CLI caused by the NR advanced dynamic TDD feature.

Figure 15:
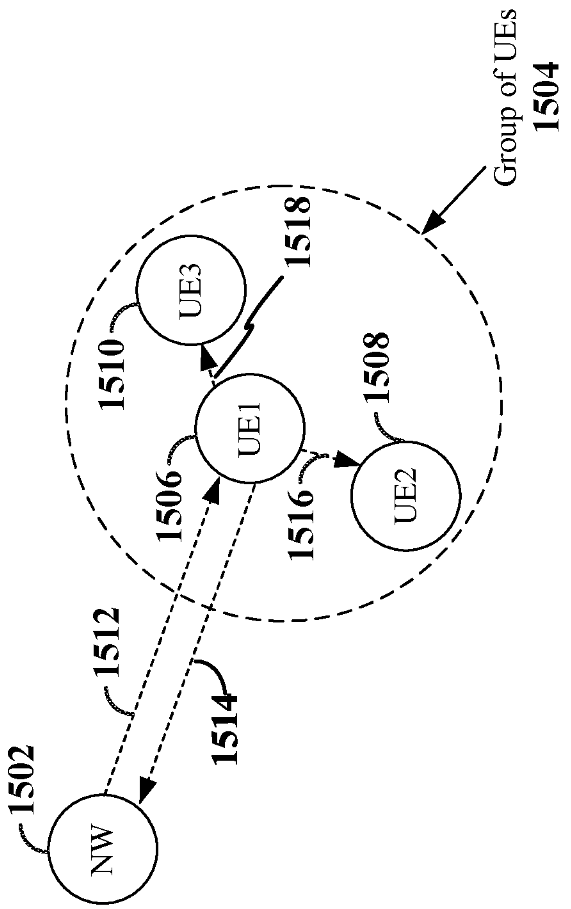
FIG. 15 is a diagram illustrating an example of indicating whether a user equipment (UE) will use a resource according to some aspects.

FIG. 15. illustrates an example 1500 where a UE uses the CLI framework to transmit an indication of whether the UE will use an allocated resource. A network entity 1502 communicates with a group of UEs 1504 including a first UE 1506, a second UE 1508, and a third UE 1510. At some point in time, the network entity 1502 configures the first UE 1506 to use a configured resource (e.g., by activating CG resources or sending a DG). The first UE 1506 may then determine whether it will use a configured resource (e.g., a particular PUSCH occasion) and send an indication of such to the network entity 1502 via signaling 1514, to the second UE 1508 via signaling 1516, and to the third UE 1510 via signaling 1518. In some examples, common signaling may be used for two or more of the signaling 1514, the signaling 1516, and the signaling 1518.

In some examples, if a first UE lacks energy, the first UE may use a backscattering module to send its own data with help from at least one other UE (e.g., through a CLI framework). For that purpose, two approaches may be employed. In a first approach, the other UE may be a full-duplex device and may send a CLI-SRS, whereby the first UE can backscatter it. In the second approach, a UE within a group may send a reference signal in known occasions/times so that the backscatter-based radio in the first UE can send the indication.

If the two UEs are geographically close, then the skipping indication may be useful, since this means they are on same range and the spatial beam used by the network may be useful for each communication link (e.g., each link between the network and each UE). Thus, backscattering may work well in this case.

Figure 16:
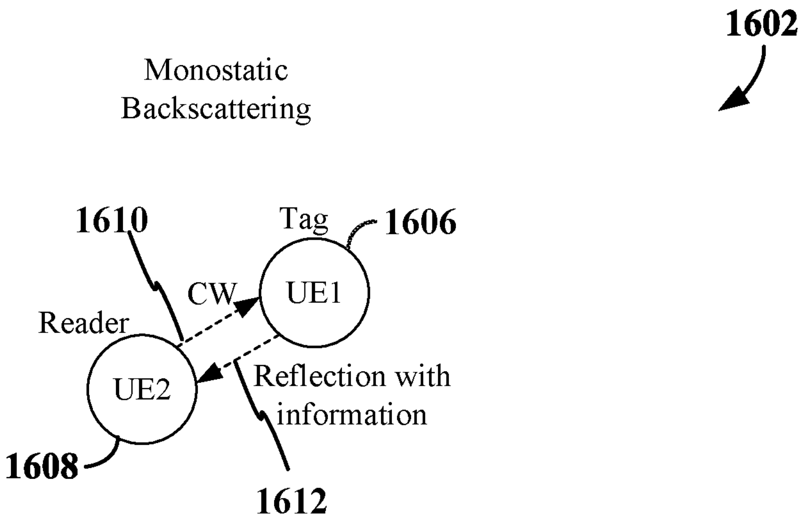
FIG. 16 is a diagram illustrating examples of using backscattering to indicate whether a user equipment (UE) will use a resource according to some aspects.
Figure 16:
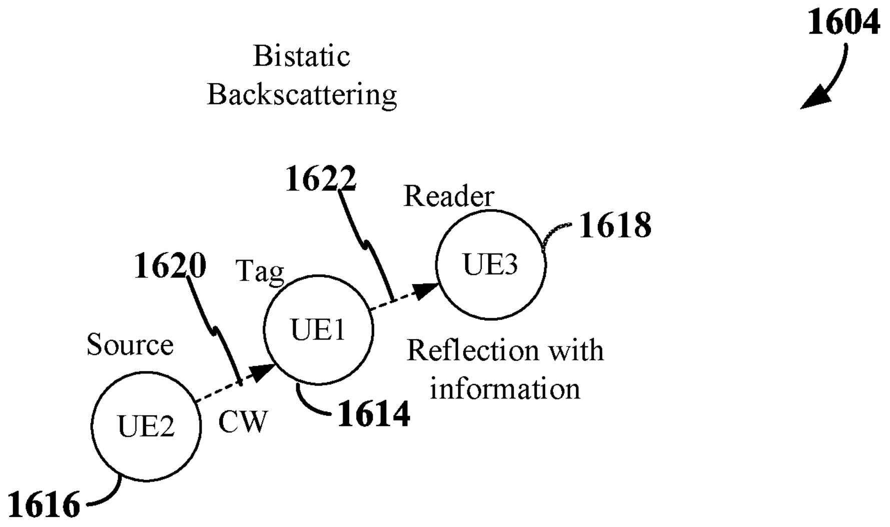

FIG. 16 illustrates two examples of backscattering that may be employed to enable a UE to transmit an indication of whether it will use a resource. A first example 1602 illustrates a monostatic backscattering technique. A second example 1604 illustrates a bistatic backscattering technique.

In the first example 1602, a first UE 1606 (e.g., a tag) communicates with a second UE 1608 (e.g., a reader). The second UE 1608 transmits a reference signal 1610 (e.g., a continuous waveform (CW)). The first UE 1606 uses the CW to power a backscatter module (e.g., an energy reflecting and modulation circuit) and thereby modulate the indication on the CW. Thus, the first UE 1606 transmits a reflection 1612 that is modulated with the information regarding whether the first UE 1606 will use a resource.

In the second example 1604, a first UE 1614 (e.g., a tag) communicates with a second UE 1616 (e.g., a CW source) and a third UE 1618 (e.g., a reader). The second UE 1616 transmits a reference signal 1620 (e.g., a CW). The first UE 1614 uses the CW to power a backscatter module and thereby modulate the indication on the CW. Thus, the first UE 1614 transmits to the third UE 1618 a reflection 1622 that is modulated with the information regarding whether the first UE 1614 will use a resource.

In some examples, instead of relying on CLI-SRS framework only, a UE may use PUCCH, PDCCH, PUSCH, RACH, or OOK-based coding schemes to deliver information between UEs or the UE may use a sidelink for this purpose. This can be standalone solution to CLI-SRS.

The network can trigger the set(s) of CLI-SRS to a UE using a DCI or as part of (re)activation DCI of an UL CG for a UE (so this DCI may be heard by the entire group, e.g., the DCI is a group common DCI) so that the UE can backscatter CLI-SRS if it lacks energy.

The UE may send an indication to other UEs using any possible interface or signaling based on capability and QoS/latency requirements. Other UEs (UE2, UE3, or others) within the group could be sharing the resources with UE1 in the form of NOMA, rate splitting, ordered access/usage, etc.

If the network cancels a resource assignment for a UE, the network can indicate this to other UEs that use the shared resource. This indication can be groupcast (or unicast) so other UEs can change transmission parameters such as rate splitting or NOMA or other network coding techniques.

In some examples, the DCI sent by the network can include power control information and quasi-colocation (QCL) information with and/or without the other one or more UEs participating in an UL transmission.

Figure 17:
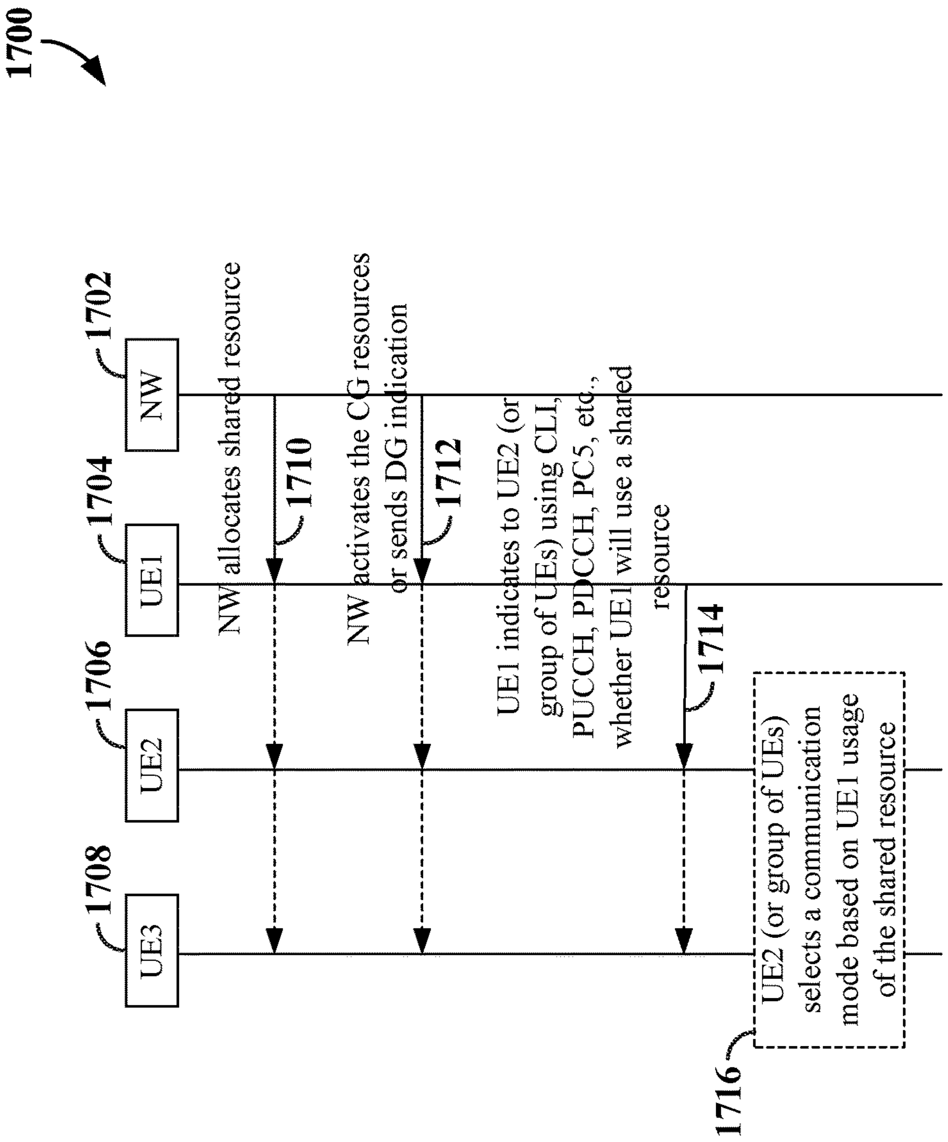
FIG. 17 is a signaling diagram illustrating an example of UE resource usage signaling according to some aspects.

FIG. 17 is a signaling diagram 1700 illustrating an example of signaling in a wireless communication system including a network entity 1702, a first user equipment 1704, a second user equipment 1706, and a third user equipment 1708. In some examples, the network entity 1702 may correspond to any of the base stations, CUs, DUs, RUs, or scheduling entities shown in any of FIGS. 1-3, 5-10, 15, 18-19, and 24. In some examples, the first user equipment 1704, the second user equipment 1706, and the third user equipment 1708 may correspond to any of the UEs, or scheduled entities shown in any of FIGS. 1-3, 5-10, 13, 15-16, and 18-20.

At #1710 of FIG. 17, the network entity 1702 allocates a shared resource for a set of UEs. In some examples, the network entity 1702 sends a message to one or more of the first user equipment 1704, the second user equipment 1706, or the third user equipment 1708 (e.g., via RRC signaling or some other type of signaling) indicating a configuration of shared resources for the first user equipment 1704, the second user equipment 1706, and the third user equipment 1708.

At #1712, the network entity 1702 sends a message (e.g., a grant) to one or more of the first user equipment 1704, the second user equipment 1706, or the third user equipment 1708 (e.g., via a DCI or some other type of signaling) to enable one or more of these UEs to use the allocated shared resource. For example, the network entity 1702 may send a configured grant (CG) or a dynamic grant (DG) to one or more of the first user equipment 1704, the second user equipment 1706, or the third user equipment 1708.

At #1714, the first user equipment 1704 determines whether it will use a configured resource and sends an indication of such to the other UEs of the group. For example, the first user equipment 1704 may inform the second user equipment 1706 and the third user equipment 1708 that the first user equipment 1704 will not use a resource (e.g., some or all of a particular resource). As another example, the first user equipment 1704 may inform the second user equipment 1706 and the third user equipment 1708 that the first user equipment 1704 will use a resource (e.g., some or all of a particular resource). As a further example, the first user equipment 1704 may inform the second user equipment 1706 and the third user equipment 1708 that the first user equipment 1704 will use a first resource and will not use a second resource.

As mentioned above, a UE may indicate that it will use all of a resource, some of the resource, or none of the resource. For example, the UE may indicate that it will or will not use the Nth PUSCH occasion. As another example, the UE may indicate that it will or will not use a portion of the Nth PUSCH occasion. Here, a portion of a PUSCH occasion may correspond to a subset of the REs that constitute that particular PUSCH occasion. Other resources and/or subsets of resources may be specified in other examples.

At #1716, the UEs of the group may select a communication mode to use on a resource indicated at #1714 based on whether the first user equipment will use that resource. For example, the second user equipment 1706 and the third user equipment 1708 may elect to change a transmit power (e.g., lower the transmit power when fewer UEs are using the resource since the interference may be lower on the resource in this case), select a particular type of MIMO (e.g., SU-MIMO instead of MU-MIMO when a single UE is using the resource), select a particular type of multiple access technology, etc.

Figure 18:
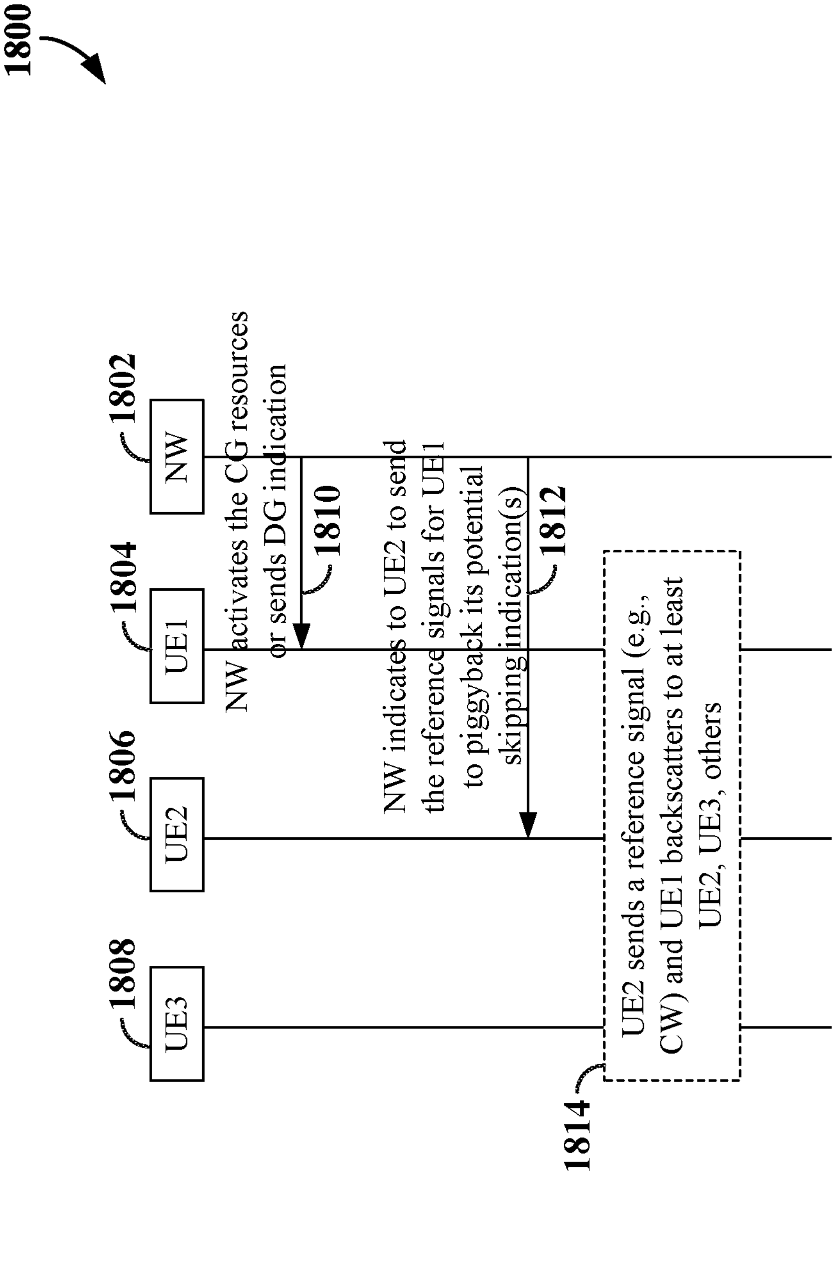
FIG. 18 is a signaling diagram illustrating another example of UE resource usage signaling according to some aspects.

FIG. 18 is a signaling diagram 1800 illustrating an example of signaling in a wireless communication system including a network entity 1802, a first user equipment 1804, a second user equipment 1806, and a third user equipment 1808. In some examples, the network entity 1802 may correspond to any of the base stations, CUs, DUs, RUs, or scheduling entities shown in any of FIGS. 1-3, 5-10, 15, 17, 19, and 24. In some examples, the first user equipment 1804, the second user equipment 1806, and the third user equipment 1808 may correspond to any of the UEs, or scheduled entities shown in any of FIGS. 1-3, 5-10, 13, 15-18, and 19-20.

As discussed above, the network entity 1802 may have allocated a shared resource for a set of UEs including the first user equipment 1804, the second user equipment 1806, and the third user equipment 1808.

At #1810, the network entity 1802 sends a message (e.g., a grant) to one or more of the first user equipment 1804, the second user equipment 1806, and the third user equipment 1808 (e.g., via a DCI or some other type of signaling) to enable one or more of these UEs to use the allocated shared resource. For example, the network entity 1802 may send a configured grant (CG) or a dynamic grant (DG) to one or more of the first user equipment 1804, the second user equipment 1806, and the third user equipment 1808.

At #1812, the network entity 1802 sends a message to the second user equipment 1806 that instructs the second user equipment 1806 to transmit a backscatter reference signal. In response, the second user equipment 1806 transmits the backscatter reference signal at #1814.

Thus, when the first user equipment 1804 determines whether it will use a configured resource (e.g., as discussed above), the first user equipment 1804 may use a backscatter technique (e.g., by modulating the reference signal received from the second user equipment 1806) to send an indication of such to the other UEs of the group. For example, the first user equipment 1804 may inform the second user equipment 1806 and the third user equipment 1808 that the first user equipment 1804 will not use a resource (e.g., particular resource). As another example, the first user equipment 1804 may inform the second user equipment 1806 and the third user equipment 1808 that the first user equipment 1804 will use a resource (e.g., particular resource). As a further example, the first user equipment 1804 may inform the second user equipment 1806 and the third user equipment 1808 that the first user equipment 1804 will use a first resource and will not use a second resource.

Thus, as discussed above, the UEs of the group may select a communication mode to use on a resource indicated at #1812 based on whether the first user equipment will use that resource. For example, the second user equipment 1806 and the third user equipment 1808 may elect to change (e.g., lower) a transmit power, select a particular type of MIMO (e.g., SU-MIMO instead of MU-MIMO), select a particular type of multiple access technology, etc.

Figure 19:
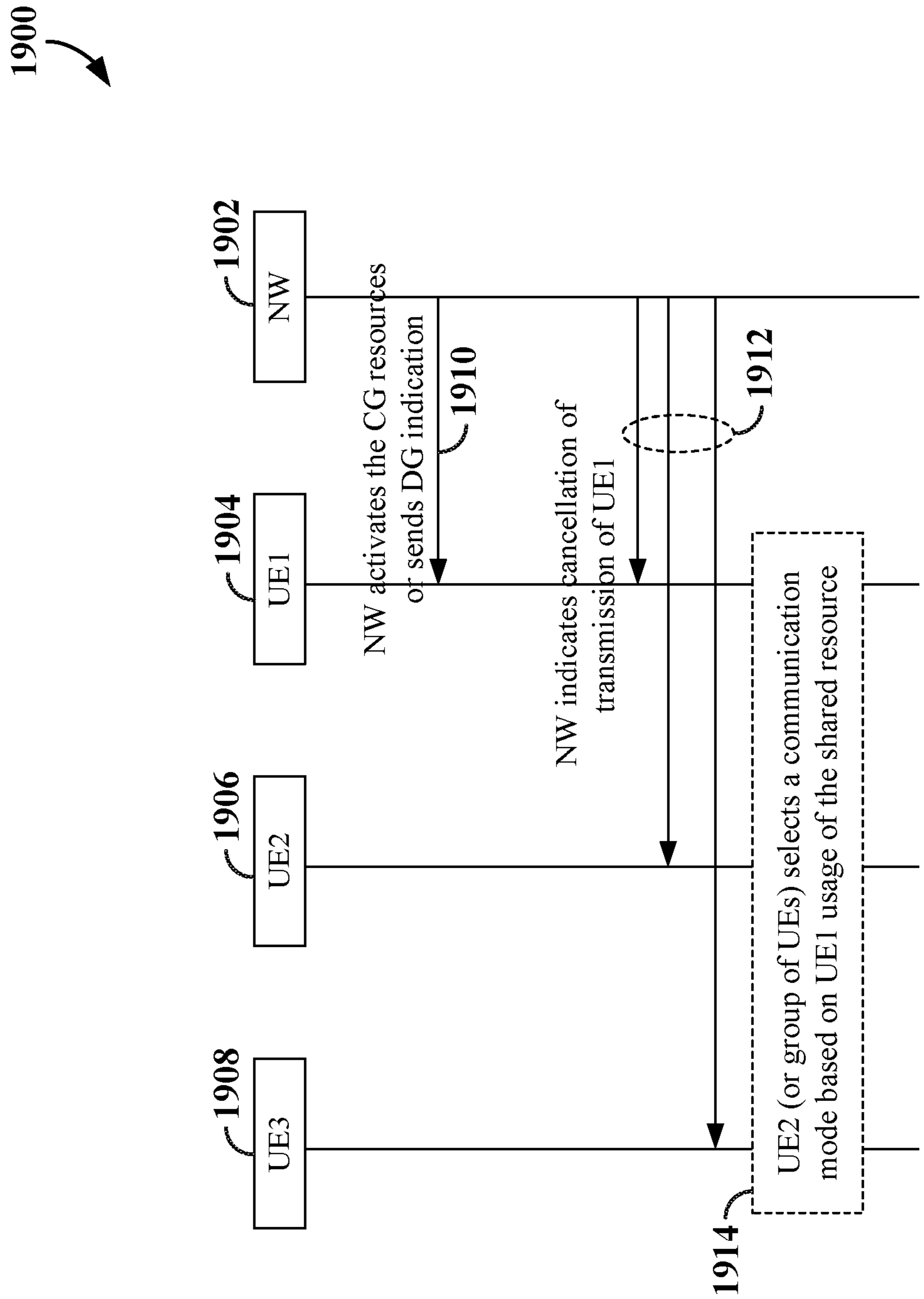
FIG. 19 is a signaling diagram illustrating another example of UE resource usage signaling according to some aspects.

FIG. 19 is a signaling diagram 1900 illustrating an example of signaling in a wireless communication system including a network entity 1902, a first user equipment 1904, a second user equipment 1906, and a third user equipment 1908. In some examples, the network entity 1902 may correspond to any of the base stations, CUs, DUs, RUs, or scheduling entities shown in any of FIGS. 1-3, 5-10, 15, 17-18, and 24. In some examples, the first user equipment 1904, the second user equipment 1906, and the third user equipment 1908 may correspond to any of the UEs, or scheduled entities shown in any of FIGS. 1-3, 5-10, 13, 15-18, and 20.

As discussed above, the network entity 1902 may have allocated a shared resource for a set of UEs including the first user equipment 1904, the second user equipment 1906, and the third user equipment 1908.

At #1910, the network entity 1902 sends a message (e.g., a grant) to one or more of the first user equipment 1904, the second user equipment 1906, and the third user equipment 1908 (e.g., via a DCI or some other type of signaling) to enable one or more of these UEs to use the allocated shared resource. For example, the network entity 1902 may send a configured grant (CG) or a dynamic grant (DG) to one or more of the first user equipment 1904, the second user equipment 1906, and the third user equipment 1908.

At #1912, the network entity 1902 determines whether the first user equipment 1904 will use a configured resource (e.g., based on an indication received from the first user equipment 1904, based on a resource cancelation by the network entity 1902, etc.) and sends an indication of such to the UEs of the group. For example, the network entity 1902 may inform the first user equipment 1904, the second user equipment 1906, and the third user equipment 1908 that the first user equipment 1904 will not use a resource (e.g., particular resource). As another example, the network entity 1902 may inform the first user equipment 1904, the second user equipment 1906, and the third user equipment 1908 that the first user equipment 1904 will use a resource (e.g., particular resource). As a further example, the network entity 1902 may inform the first user equipment 1904, the second user equipment 1906, and the third user equipment 1908 that the first user equipment 1904 will use a first resource and will not use a second resource.

At #1914, the UEs of the group may select a communication mode to use on a resource indicated at #1914 based on whether the first user equipment will use that resource. For example, the second user equipment 1906 and the third user equipment 1908 may elect to change (e.g., lower) a transmit power, select a particular type of MIMO (e.g., SU-MIMO instead of MU-MIMO), select a particular type of multiple access technology, etc.

In some implementations, the teachings herein may be implemented in a peer-to-peer network. In this case, the functionality of the network entities discussed herein may be implemented by one of the peer-to-peer devices (e.g., sidelink devices such as UEs). In addition, the functionality discussed herein may be implemented using peer-to-peer control information (e.g., in this case, downlink refers to a link from a first UE to a second UE, and uplink refers to a link from the second UE to the first UE). Furthermore, the channels referred to herein may be peer-to-peer (e.g., sidelink) channels.

Figure 20:
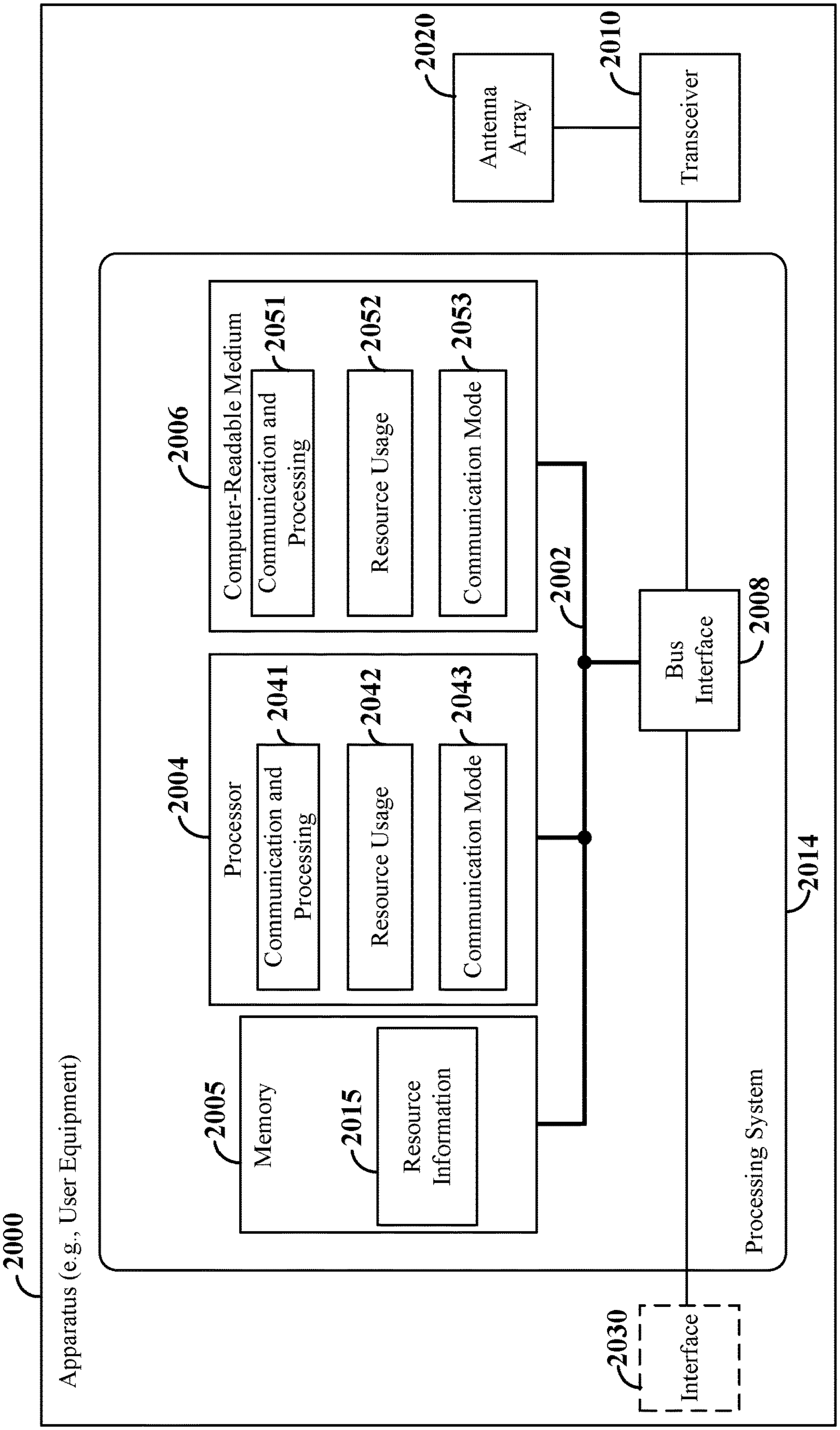
FIG. 20 is a block diagram conceptually illustrating an example of a hardware implementation for an apparatus (e.g., a user equipment) employing a processing system according to some aspects.

FIG. 20 is a block diagram illustrating an example of a hardware implementation for an apparatus 2000 employing a processing system 2014. For example, the apparatus 2000 may be a device configured to wirelessly communicate in a network as discussed in any of FIGS. 1-19. In some implementations, the apparatus 2000 may correspond to any of the UEs, sidelink devices, D2D devices, or scheduled entities shown in any of FIGS. 1-3, 5-10, 13, and 15-19.

In accordance with various aspects of the disclosure, an element, or any portion of an element, or any combination of elements may be implemented with the processing system 2014. The processing system 2014 may include one or more processors (referred to herein as the processor 2004, for convenience). Examples of processors 2004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 2000 may be configured to perform any one or more of the functions described herein. That is, the processor 2004, as utilized in an apparatus 2000, may be used to implement any one or more of the processes and procedures described herein.

The processor 2004 may in some instances be implemented via a baseband or modem chip and in other implementations, the processor 2004 may itself include a number of devices distinct and different from a baseband or modem chip (e.g., in such scenarios these devices may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2014 may be implemented with a bus architecture, represented generally by the bus 2002. The bus 2002 may include any number of interconnecting buses and bridges depending on the specific application of the processing system 2014 and the overall design constraints. The bus 2002 communicatively couples together various circuits including one or more processors (represented generally by the processor 2004), one or more memories (referred to herein as the memory 2005, for convenience), and one or more computer-readable media (represented generally by the computer-readable medium 2006). The bus 2002 may also link various other circuits such as timing sources, peripherals, voltage regulators, and power management circuits, which are well known in the art, and therefore, will not be described any further. A bus interface 2008 provides an interface between the bus 2002, a transceiver 2010 and an antenna array 2020 and between the bus 2002 and an interface 2030. The transceiver 2010 provides a communication interface or means for communicating with various other apparatus over a wireless transmission medium. The interface 2030 provides a communication interface or means of communicating with various other apparatuses and devices (e.g., other devices housed within the same apparatus as the apparatus 2000 or other external apparatuses) over an internal bus or external transmission medium, such as an Ethernet cable. Depending upon the nature of the apparatus, the interface 2030 may include a user interface (e.g., keypad, display, speaker, microphone, joystick). Of course, such a user interface is optional, and may be omitted in some examples, such as an IoT device.

The processor 2004 is responsible for managing the bus 2002 and general processing, including the execution of software stored on the computer-readable medium 2006. The software, when executed by the processor 2004, causes the processing system 2014 to perform the various functions described below for any particular apparatus. The computer-readable medium 2006 and the memory 2005 may also be used for storing data that is manipulated by the processor 2004 when executing software. For example, the memory 2005 may store resource information 2015 (e.g., indicative of UE resource usage) used by the processor 2004 for the communication operations described herein.

One or more processors 2004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2006.

The computer-readable medium 2006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2006 may reside in the processing system 2014, external to the processing system 2014, or distributed across multiple entities including the processing system 2014. The computer-readable medium 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 2000 may be configured to perform any one or more of the operations described herein (e.g., as described above in conjunction with FIGS. 1-19 and as described below in conjunction with FIGS. 21-23). In some aspects of the disclosure, the processor 2004, as utilized in the apparatus 2000, may include circuitry configured for various functions.

The processor 2004 may be configured to generate, schedule, and modify a resource assignment or grant of time-frequency resources (e.g., a set of one or more resource elements). For example, the processor 2004 may schedule time-frequency resources within a plurality of time division duplex (TDD) and/or frequency division duplex (FDD) subframes, slots, and/or mini-slots to carry user data traffic and/or control information to and/or from multiple scheduled entities. The processor 2004 may be configured to schedule resources for the transmission of sidelink signals or other types of signals.

In some aspects of the disclosure, the processor 2004 may include communication and processing circuitry 2041. The communication and processing circuitry 2041 may be configured to communicate with a user equipment. The communication and processing circuitry 2041 may include one or more hardware components that provide the physical structure that performs various processes related to communication (e.g., signal reception and/or signal transmission) as described herein. The communication and processing circuitry 2041 may further include one or more hardware components that provide the physical structure that performs various processes related to signal processing (e.g., processing a received signal and/or processing a signal for transmission) as described herein. The communication and processing circuitry 2041 may further be configured to execute communication and processing software 2051 included on the computer-readable medium 2006 to implement one or more functions described herein.

The communication and processing circuitry 2041 may further be configured to send or receive an indication. For example, the indication may be included in a MAC-CE carried in a Uu PUSCH, Uu PDSCH, or a PSCCH, or included in a Uu RRC message or an SL RRC message. The communication and processing circuitry 2041 may further be configured to send a scheduling request an uplink grant or a sidelink grant.

In some implementations where the communication involves receiving information, the communication and processing circuitry 2041 may obtain information from a component of the apparatus 2000 (e.g., from the transceiver 2010 that receives the information via radio frequency signaling or some other type of signaling suitable for the applicable communication medium), process (e.g., decode) the information, and output the processed information. For example, the communication and processing circuitry 2041 may output the information to another component of the processor 2004, to the memory 2005, or to the bus interface 2008. In some examples, the communication and processing circuitry 2041 may receive one or more of signals, messages, other information, or any combination thereof. In some examples, the communication and processing circuitry 2041 may receive information via one or more channels. In some examples, the communication and processing circuitry 2041 may receive one or more of signals, messages, SCIs, feedback, other information, or any combination thereof. In some examples, the communication and processing circuitry 2041 may receive information via one or more of a PSCCH, a PSSCH, a PSFCH, some other type of channel, or any combination thereof. In some examples, the communication and processing circuitry 2041 and/or the transceiver 2010 may include functionality for a means for receiving. In some examples, the communication and processing circuitry 2041 may include functionality for a means for decoding. In some examples, the communication and processing circuitry 2041 may include functionality for a means for receiving information from a network entity.

In some implementations where the communication involves sending (e.g., transmitting) information, the communication and processing circuitry 2041 may obtain information (e.g., from another component of the processor 2004, the memory 2005, or the bus interface 2008), process (e.g., encode) the information, and output the processed information. For example, the communication and processing circuitry 2041 may output the information to the transceiver 2010 (e.g., that transmits the information via radio frequency signaling or some other type of signaling suitable for the applicable communication medium). In some examples, the communication and processing circuitry 2041 may send one or more of signals, messages, other information, or any combination thereof. In some examples, the communication and processing circuitry 2041 may send information via one or more channels. In some examples, the communication and processing circuitry 2041 may send one or more of signals, messages, SCIs, feedback, other information, or any combination thereof. In some examples, the communication and processing circuitry 2041 may send information via one or more of a PSCCH, a PSSCH, a PSFCH, some other type of channel, or any combination thereof. In some examples, the communication and processing circuitry 2041 and/or the transceiver 2010 may include functionality for a means for transmitting. In some examples, the communication and processing circuitry 2041 may include functionality for a means for encoding. In some examples, the communication and processing circuitry 2041 may include functionality for a means for transmitting information to a network entity.

The transceiver 2010 or other transmitter circuitry may include functionality for a means for transmitting a signal (e.g., as described above in conjunction with FIGS. 10-19). For example, the transceiver 2010 may include an energy reflecting and modulation circuit to transmit backscatter signaling. As another example, the transceiver 2010 or other transmitter circuitry may include circuitry to transmit on-off keying signaling (e.g., selectively transmit a carrier on a particular bandwidth and slot(s)).

The transceiver 2010 or other receiver circuitry may include functionality for a means for receiving a signal (e.g., as described above in conjunction with FIGS. 10-19). For example, the transceiver 2010 may include an energy sensing circuit to receive backscatter signaling. As another example, the transceiver 2010 circuitry may include circuitry to receive on-off keying signaling (e.g., receive on a particular bandwidth and slot(s)).

The processor 2004 may include resource usage circuitry 2042 configured to perform resource usage-related operations as discussed herein (e.g., one or more of the operations described above in conjunction with FIGS. 10-19). The resource usage circuitry 2042 may be configured to execute resource usage software 2052 included on the computer-readable medium 2006 to implement one or more functions described herein.

The resource usage circuitry 2042 may include functionality for a means for obtaining a message (e.g., as described above in conjunction with FIGS. 10-19). For example, the resource usage circuitry 2042 may obtain (e.g., receive) information (e.g., a DCI, a groupcast message, etc.) from a network entity (e.g., via a PDCCH, a PDSCH, etc.). As another example, the resource usage circuitry 2042 may obtain information (e.g., UCI, SCI, etc.) from a UE. As a further example, the resource usage circuitry 2042 may obtain a message that indicates a resource. As yet another example, the resource usage circuitry 2042 may obtain a message (e.g., a configured grant, a dynamic grant, etc.) that indicates an allocation of at least one shared resource. As a further example, the resource usage circuitry 2042 may obtain a reference signal schedule (e.g., from a network entity, a UE, etc.). As yet another example, the resource usage circuitry 2042 may obtain a message that indicates whether a UE will use a resource.

The resource usage circuitry 2042 may include functionality for a means for processing a message (e.g., as described above in conjunction with FIGS. 10-19). For example, the resource usage circuitry 2042 may decode a DCI based on a radio network temporary identifier (RNTI), a search space, and/or other information. In various examples, the resource usage circuitry 2042 may be configured to receive and/or decode a PDSCH, a PDCCH, a PUSCH, a PUCCH, a PSSCH, a PSCCH, an SRS, a RACH, on-off keying, or other signaling.

The resource usage circuitry 2042 may include functionality for a means for outputting a message (e.g., as described above in conjunction with FIGS. 10-19). For example, the resource usage circuitry 2042 may output a message (e.g., to a network entity, a UE, etc.) that indicates whether the apparatus will use a resource. In some examples, this message may be output via a configured measurement resource (e.g., a CLI measurement resource). As another example, the resource usage circuitry 2042 may output a reference signal schedule. In various examples, the resource usage circuitry 2042 may output a message for transmission via an uplink channel, a downlink channel, a sidelink channel, a random access channel, backscatter signaling, or on-off keying signaling.

The resource usage circuitry 2042 may include functionality for a means for invoking transmission (e.g., as described above in conjunction with FIGS. 10-19). For example, the resource usage circuitry 2042 may invoke transmission of a backscatter reference signal by the transceiver 2010 or other transmitter circuitry.

The processor 2004 may include communication mode circuitry 2043 configured to perform communication mode-related operations as discussed herein (e.g., one or more of the operations described above in conjunction with FIGS. 10-19). The communication mode circuitry 2043 may be configured to execute communication mode software 2053 included on the computer-readable medium 2006 to implement one or more functions described herein.

The communication mode circuitry 2043 may include functionality for a means for performing a communication mode operation (e.g., as described above in conjunction with FIGS. 10-19). For example, the communication mode circuitry 2043 may select a mode of operation for a transmission such as transmit power, type of MIMO, etc.

The communication mode circuitry 2043 may include functionality for a means for obtaining a message (e.g., as described above in conjunction with FIGS. 10-19). For example, the communication mode circuitry 2043 may obtain (e.g., receive) a message from a network entity (e.g., via a PDSCH). As another example, the communication mode circuitry 2043 may receive information from a UE.

The communication mode circuitry 2043 may include functionality for a means for outputting a message (e.g., as described above in conjunction with FIGS. 10-19). For example, the communication mode circuitry 2043 may output (e.g., transmit) a message to a network entity (e.g., via a PUSCH). As another example, the communication mode circuitry 2043 may output a message according to a selected communication mode (e.g., output the message using SU-MIMO, MU-MIMO, NOMA, rate-splitting, a particular transmit power, etc.).

The communication mode circuitry 2043 may include functionality for a means for switching between communication modes (e.g., as described above in conjunction with FIGS. 10-19). In some examples, the communication mode circuitry 2043 may switch between communication modes based on whether a UE will be using a shared resource. In some examples, the communication mode circuitry 2043 may switch between communication modes to obtain a message. In some examples, the communication mode circuitry 2043 may switch between communication modes to output a message for transmission.

Different types of communication modes may be used in different examples. For example, the communication mode circuitry 2043 may switch from SU-MIMO to MU-MIMO, or vice-versa. As another example, the communication mode circuitry 2043 may switch to the use of NOMA or switch from the use of NOMA. As a further example, the communication mode circuitry 2043 may switch to the use of rate-splitting or switch from the use of rate-splitting. As yet another example, the communication mode circuitry 2043 may switch from the use of a first transmit power to the use of a second transmit power.

The communication mode circuitry 2043 may include functionality for a means for decoding (e.g., as described above in conjunction with FIGS. 10-19). For example, the communication mode circuitry 2043 may decode a message received from a network entity or some other device.

Figure 21:
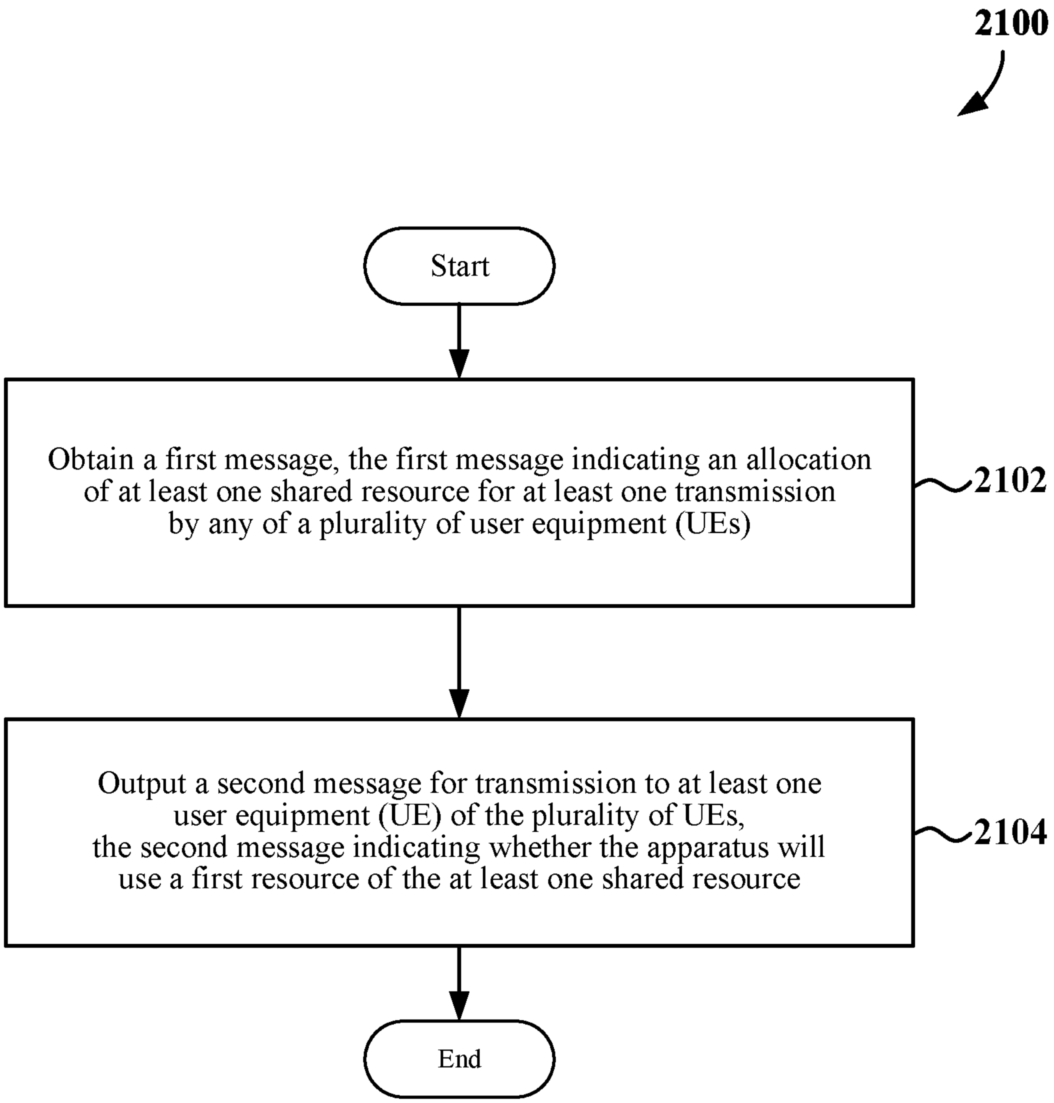
FIG. 21 is a flow chart illustrating an example communication method involving indicating whether an apparatus will use a resource according to some aspects.

FIG. 21 is a flow chart illustrating an example method 2100 for communication in accordance with some aspects of the present disclosure. As described below, some or all illustrated features may be omitted in a particular implementation within the scope of the present disclosure, and some illustrated features may not be required for implementation of all examples. In some examples, the method 2100 (e.g., a method for wireless communication) may be carried out by the apparatus 2000 illustrated in FIG. 20, the apparatus 702 illustrated in FIG. 7, the wireless node illustrated in FIG. 7, or another wireless node. In some examples, the method 2100 may be carried out by any suitable apparatus or means for carrying out the functions or algorithm described below.

At block 2102, an apparatus may obtain a first message, the first message indicating an allocation of at least one shared resource for at least one transmission by any of a plurality of user equipment (UEs). In some examples, the resource usage circuitry 2042, shown and described in FIG. 20, may provide a means to obtain a first message, the first message indicating an allocation of at least one shared resource for at least one transmission by any of a plurality of user equipment (UEs). In some examples, the resource usage circuitry 2042 together with the communication and processing circuitry 2041 and the transceiver 2010, shown and described in FIG. 20, may provide a means to obtain a first message, the first message indicating an allocation of at least one shared resource for at least one transmission by any of a plurality of user equipment (UEs). In some examples, the communication and processing circuitry 2041 and/or the transceiver 2010, shown and described in FIG. 20, may provide a means to obtain a first message, the first message indicating an allocation of at least one shared resource for at least one transmission by any of a plurality of user equipment (UEs).

At block 2104, the apparatus may output a second message for transmission to at least one user equipment (UE) of the plurality of UEs, the second message indicating whether the apparatus will use a first resource of the at least one shared resource. In some examples, the resource usage circuitry 2042, shown and described in FIG. 20, may provide a means to output a second message for transmission to at least one user equipment (UE) of the plurality of UEs, the second message indicating whether the apparatus will use a first resource of the at least one shared resource. In some examples, the resource usage circuitry 2042 together with the communication and processing circuitry 2041 and the transceiver 2010, shown and described in FIG. 20, may provide a means to output a second message for transmission to at least one user equipment (UE) of the plurality of UEs, the second message indicating whether the apparatus will use a first resource of the at least one shared resource. In some examples, the communication and processing circuitry 2041 and/or the transceiver 2010, shown and described in FIG. 20, may provide a means to output a second message for transmission to at least one user equipment (UE) of the plurality of UEs, the second message indicating whether the apparatus will use a first resource of the at least one shared resource.

In some examples, the apparatus (e.g., a first UE) may obtain a third message (e.g., from the network entity, from a sidelink UE, etc.), the third message indicating a resource, wherein the second message is output for transmission based on the resource. In some examples, the apparatus may obtain a third message from the network entity, the third message indicating a resource for transmission of the second message.

In some examples, the apparatus may output the second message for transmission via a configured measurement resource. In some examples, the apparatus may output the second message for transmission via a cross-link interference (CLI) measurement resource.

In some examples, the apparatus may output the second message for transmission via backscatter signaling. In some examples, the apparatus may output the second message for transmission via backscatter signaling according to a reference signal schedule. In some examples, the apparatus may obtain the reference signal schedule.

In some examples, the apparatus may output the second message for transmission via an uplink channel. In some examples, the apparatus may output the second message for transmission via a downlink channel, via a sidelink channel, or via on-off keying signaling.

In some examples, the at least one shared resource may include a plurality of physical uplink shared channel (PUSCH) occasions. In some examples, the first resource may include at least one PUSCH occasion of the plurality of PUSCH occasions. In some examples, the first resource may be a subset of a first PUSCH occasion of the plurality of PUSCH occasions.

In some examples, the first message may be a configured grant. In some examples, the first message may be a dynamic grant.

In some examples, the apparatus may output a third message for transmission to a network entity, the third message indicating whether the apparatus (e.g., the first UE) will use the first resource of the at least one shared resource.

In some examples, the apparatus may receive the first message and transmit the second message. In some examples, the apparatus is configured as a UE (e.g., the first UE).

Figure 22:
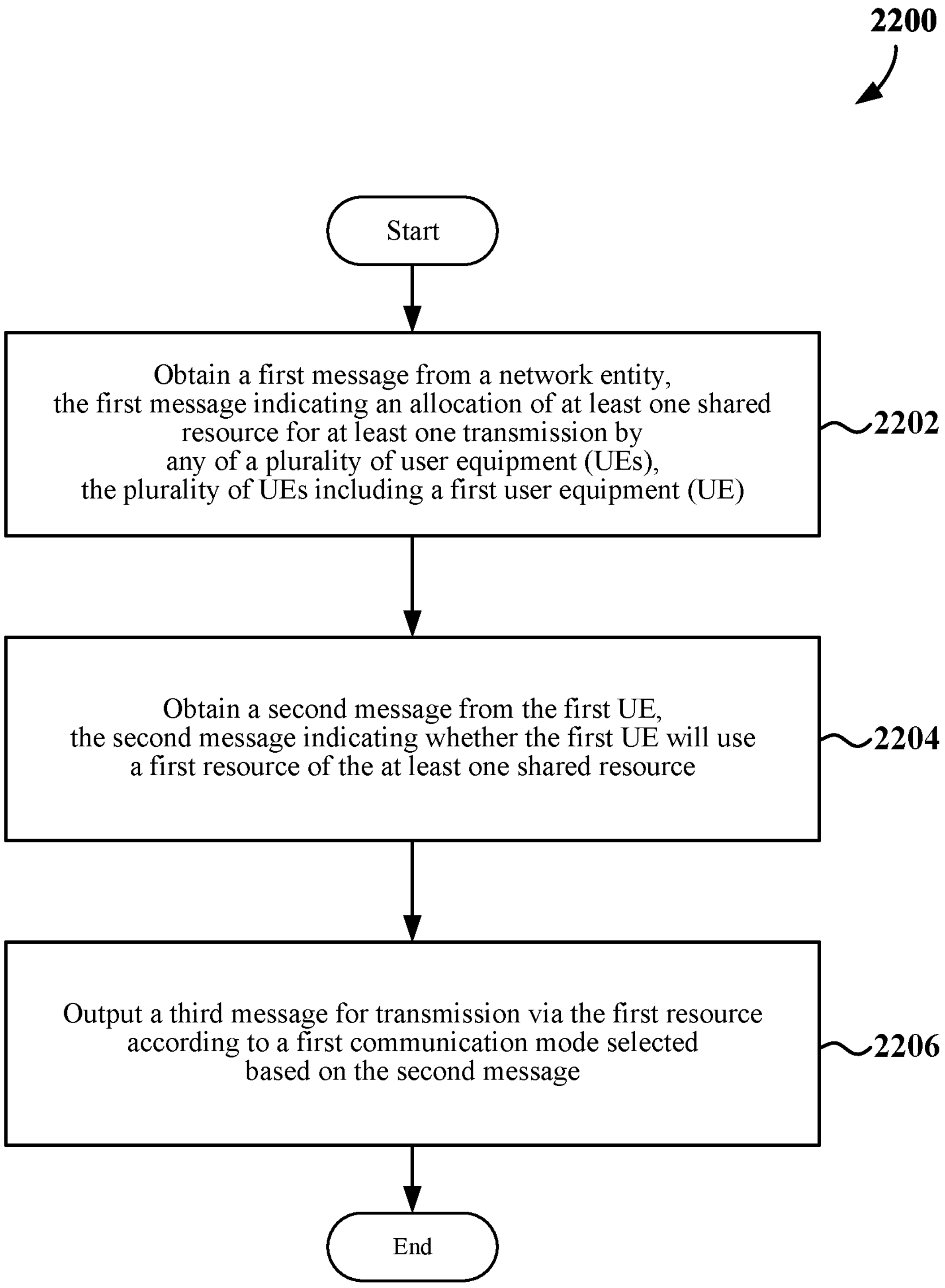
FIG. 22 is a flow chart illustrating another example communication method involving indicating whether a UE will use a resource according to some aspects.

FIG. 22 is a flow chart illustrating an example method 2200 for communication in accordance with some aspects of the present disclosure. As described below, some or all illustrated features may be omitted in a particular implementation within the scope of the present disclosure, and some illustrated features may not be required for implementation of all examples. In some examples, the method 2200 (e.g., a method for wireless communication) may be carried out by the apparatus 2000 illustrated in FIG. 20, the apparatus 702 illustrated in FIG. 7, the wireless node illustrated in FIG. 7, or another wireless node. In some examples, the method 2200 may be carried out by any suitable apparatus or means for carrying out the functions or algorithm described below.

At block 2202, an apparatus may obtain a first message from a network entity, the first message indicating an allocation of at least one shared resource for at least one transmission by any of a plurality of user equipment (UEs), the plurality of UEs including a first user equipment (UE). In some examples, the resource usage circuitry 2042, shown and described in FIG. 20, may provide a means to obtain a first message from a network entity, the first message indicating an allocation of at least one shared resource for at least one transmission by any of a plurality of user equipment (UEs), the plurality of UEs including a first user equipment (UE). In some examples, the resource usage circuitry 2042 together with the communication and processing circuitry 2041 and the transceiver 2010, shown and described in FIG. 20, may provide a means to obtain a first message from a network entity, the first message indicating an allocation of at least one shared resource for at least one transmission by any of a plurality of user equipment (UEs), the plurality of UEs including a first user equipment (UE). In some examples, the communication and processing circuitry 2041 and/or the transceiver 2010, shown and described in FIG. 20, may provide a means to obtain a first message from a network entity, the first message indicating an allocation of at least one shared resource for at least one transmission by any of a plurality of user equipment (UEs), the plurality of UEs including a first user equipment (UE).

At block 2204, the apparatus may obtain a second message from the first UE, the second message indicating whether the first UE will use a first resource of the at least one shared resource. In some examples, the resource usage circuitry 2042, shown and described in FIG. 20, may provide a means to obtain a second message from the first UE, the second message indicating whether the first UE will use a first resource of the at least one shared resource. In some examples, the resource usage circuitry 2042 together with the communication and processing circuitry 2041 and the transceiver 2010, shown and described in FIG. 20, may provide a means to obtain a second message from the first UE, the second message indicating whether the first UE will use a first resource of the at least one shared resource. In some examples, the communication and processing circuitry 2041 and/or the transceiver 2010, shown and described in FIG. 20, may provide a means to obtain a second message from the first UE, the second message indicating whether the first UE will use a first resource of the at least one shared resource.

At block 2206, the apparatus may output a third message for transmission via the first resource according to a first communication mode selected based on the second message. In some examples, the communication mode circuitry 2043, shown and described in FIG. 20, may provide a means to output a third message for transmission via the first resource according to a first communication mode selected based on the second message. In some examples, the communication mode circuitry 2043 together with the communication and processing circuitry 2041 and the transceiver 2010, shown and described in FIG. 20, may provide a means to output a third message for transmission via the first resource according to a first communication mode selected based on the second message. In some examples, the communication and processing circuitry 2041 and/or the transceiver 2010, shown and described in FIG. 20, may provide a means to output a third message for transmission via the first resource according to a first communication mode selected based on the second message.

In some examples, the apparatus (e.g., a second UE) may switch from a second communication mode to the first communication mode to output the third message for transmission via the first resource based on the second message indicating that the first UE will not use the first resource. In some examples, the first communication mode is associated with a first transmit power. In some examples, the second communication mode is associated with a second transmit power that is different from the first transmit power.

In some examples, the first communication mode is associated with single-user multiple-input multiple-output (MIMO) communication. In some examples, the second communication mode is associated with multi-user MIMO communication. In some examples, the second communication mode is associated with non-orthogonal multiple access (NOMA) communication or rate-splitting communication.

In some examples, the apparatus may invoke transmission of a backscatter reference signal according to a reference signal schedule. In some examples, the apparatus may output the reference signal schedule for transmission.

In some examples, the apparatus may obtain a fourth message, the fourth message indicating a resource, wherein the second message is obtained based on the resource. In some examples, the apparatus may obtain a fourth message from the network entity, the fourth message indicating a resource for reception of the second message.

In some examples, the apparatus may obtain the second message via a configured measurement resource. In some examples, the apparatus may obtain the second message via a cross-link interference (CLI) measurement resource.

In some examples, the apparatus may obtain the second message via a backscatter signaling. In some examples, the apparatus may obtain the second message via a backscatter signaling according to a reference signal schedule. In some examples, the apparatus may obtain the reference signal schedule (e.g., from a network entity).

In some examples, the apparatus may obtain the second message via an uplink channel. In some examples, the apparatus may obtain the second message via a downlink channel. In some examples, the apparatus may obtain the second message via a sidelink channel. In some examples, the apparatus may obtain the second message via on-off keying signaling.

In some examples, the at least one shared resource may include a plurality of physical uplink shared channel (PUSCH) occasions. In some examples, the first resource may include at least one PUSCH occasion of the plurality of PUSCH occasions. In some examples, the first resource may be a subset of a first PUSCH occasion of the plurality of PUSCH occasions.

In some examples, the at least one shared resource may include a plurality of physical uplink shared channel (PUSCH) occasions. In some examples, the first resource may include at least one PUSCH occasion of the plurality of PUSCH occasions.

In some examples, the first message may be a configured grant. In some examples, the first message may be a dynamic grant.

In some examples, the apparatus may receive the first message and the second message and transmit the third message. In some examples, the apparatus is configured as a UE (e.g., the second UE).

Figure 23:
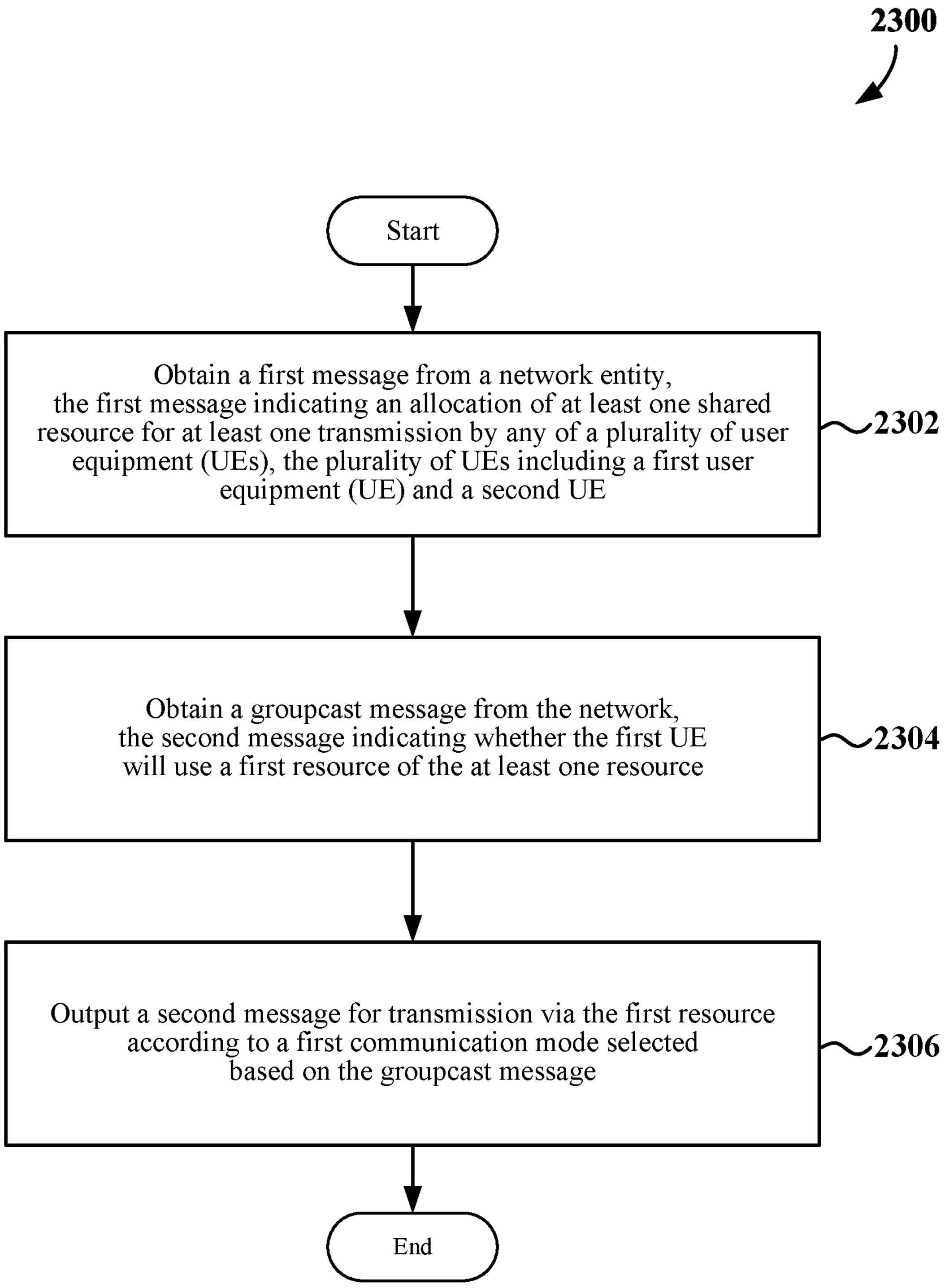
FIG. 23 is a flow chart illustrating another example communication method involving indicating whether a UE will use a resource according to some aspects.

FIG. 23 is a flow chart illustrating an example method 2300 for communication in accordance with some aspects of the present disclosure. As described below, some or all illustrated features may be omitted in a particular implementation within the scope of the present disclosure, and some illustrated features may not be required for implementation of all examples. In some examples, the method 2300 (e.g., a method for wireless communication) may be carried out by the apparatus 2000 illustrated in FIG. 20, the apparatus 702 illustrated in FIG. 7, the wireless node illustrated in FIG. 7, or another wireless node. In some examples, the method 2300 may be carried out by any suitable apparatus or means for carrying out the functions or algorithm described below.

At block 2302, an apparatus may obtain a first message from a network entity, the first message indicating an allocation of at least one shared resource for at least one transmission by any of a plurality of user equipment (UEs), the plurality of UEs including a first user equipment (UE) and a second UE. In some examples, the resource usage circuitry 2042, shown and described in FIG. 20, may provide a means to obtain a first message from a network entity, the first message indicating an allocation of at least one shared resource for at least one transmission by any of a plurality of user equipment (UEs), the plurality of UEs including a first user equipment (UE) and a second UE. In some examples, the resource usage circuitry 2042 together with the communication and processing circuitry 2041 and the transceiver 2010, shown and described in FIG. 20, may provide a means to obtain a first message from a network entity, the first message indicating an allocation of at least one shared resource for at least one transmission by a any of a plurality of user equipment (UEs), the plurality of UEs including a first user equipment (UE) and a second UE. In some examples, the communication and processing circuitry 2041 and/or the transceiver 2010, shown and described in FIG. 20, may provide a means to obtain a first message from a network entity, the first message indicating an allocation of at least one shared resource for at least one transmission by any of a plurality of user equipment (UEs), the plurality of UEs including a first user equipment (UE) and a second UE.

At block 2304, the apparatus may obtain a groupcast message from the network entity, the groupcast message indicating whether the first UE will use a first resource of the at least one shared resource. In some examples, the communication mode circuitry 2043, shown and described in FIG. 20, may provide a means to obtain a groupcast message from the network entity, the groupcast message indicating whether the first UE will use a first resource of the at least one shared resource. In some examples, the communication mode circuitry 2043 together with the communication and processing circuitry 2041 and the transceiver 2010, shown and described in FIG. 20, may provide a means to obtain a groupcast message from the network entity, the groupcast message indicating whether the first UE will use a first resource of the at least one shared resource. In some examples, the communication and processing circuitry 2041 and/or the transceiver 2010, shown and described in FIG. 20, may provide a means to obtain a groupcast message from the network entity, the groupcast message indicating whether the first UE will use a first resource of the at least one shared resource.

At block 2306, the apparatus may output a second message for transmission via the first resource according to a first communication mode selected based on the groupcast message. In some examples, the communication mode circuitry 2043, shown and described in FIG. 20, may provide a means to output a second message for transmission via the first resource according to a first communication mode selected based on the groupcast message. In some examples, the communication mode circuitry 2043 together with the communication and processing circuitry 2041 and the transceiver 2010, shown and described in FIG. 20, may provide a means to output a second message for transmission via the first resource according to a first communication mode selected based on the groupcast message. In some examples, the communication and processing circuitry 2041 and/or the transceiver 2010, shown and described in FIG. 20, may provide a means to output a second message for transmission via the first resource according to a first communication mode selected based on the groupcast message.

In some examples, the apparatus may switch from a second communication mode to the first communication mode to output the second message for transmission via the first resource based on the second message indicating that the first UE will not use the first resource. In some examples, the first communication mode is associated with a first transmit power. In some examples, the second communication mode is associated with a second transmit power that is different from the first transmit power. In some examples, the second communication mode is associated with (MIMO) communication, non-orthogonal multiple access (NOMA) communication, or rate-splitting communication.

In some examples, the first message may be a configured grant. In some examples, the first message may be a dynamic grant.

In some examples, the at least one shared resource may include a plurality of physical uplink shared channel (PUSCH) occasions. In some examples, the first resource may include at least one PUSCH occasion of the plurality of PUSCH occasions.

In some examples, the apparatus may receive the first message and the groupcast message and transmit the second message. In some examples, the apparatus is configured as a UE (e.g., the second UE).

Referring again to FIG. 20, in one configuration, the apparatus 2000 includes means for obtaining a first message, the first message indicating an allocation of at least one shared resource for at least one transmission by any of a plurality of user equipment (UEs), and means for outputting a second message for transmission to at least one user equipment (UE) of the plurality of UEs, the second message indicating whether the apparatus will use a first resource of the at least one shared resource. In one configuration, the apparatus 2000 includes means for obtaining a first message from a network entity, the first message indicating an allocation of at least one shared resource for at least one transmission by any of a plurality of user equipment (UEs), the plurality of UEs including a first user equipment (UE), means for obtaining a second message from the first user equipment, the second message indicating whether the first user equipment will use a first resource of the at least one shared resource, and means for outputting a third message for transmission via the first resource according to a first communication mode selected based on the second message. In one configuration, the apparatus 2000 includes means for obtaining a first message from a network entity, the first message indicating an allocation of at least one shared resource for at least one transmission by any of a plurality of user equipment (UEs), the plurality of UEs including a first user equipment (UE) and a second UE, means for obtaining a groupcast message from the network entity, the groupcast message indicating whether the first user equipment will use a first resource of the at least one shared resource, and means for outputting a second message for transmission via the first resource according to a first communication mode selected based on the groupcast message. In one aspect, the aforementioned means may be the processor 2004 shown in FIG. 20 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable medium 2006, or any other suitable apparatus or means described in any of FIGS. 1-3, 5-10, 13, and 15-20, and utilizing, for example, the methods and/or algorithms described herein in relation to FIGS. 21-23.

Figure 24:
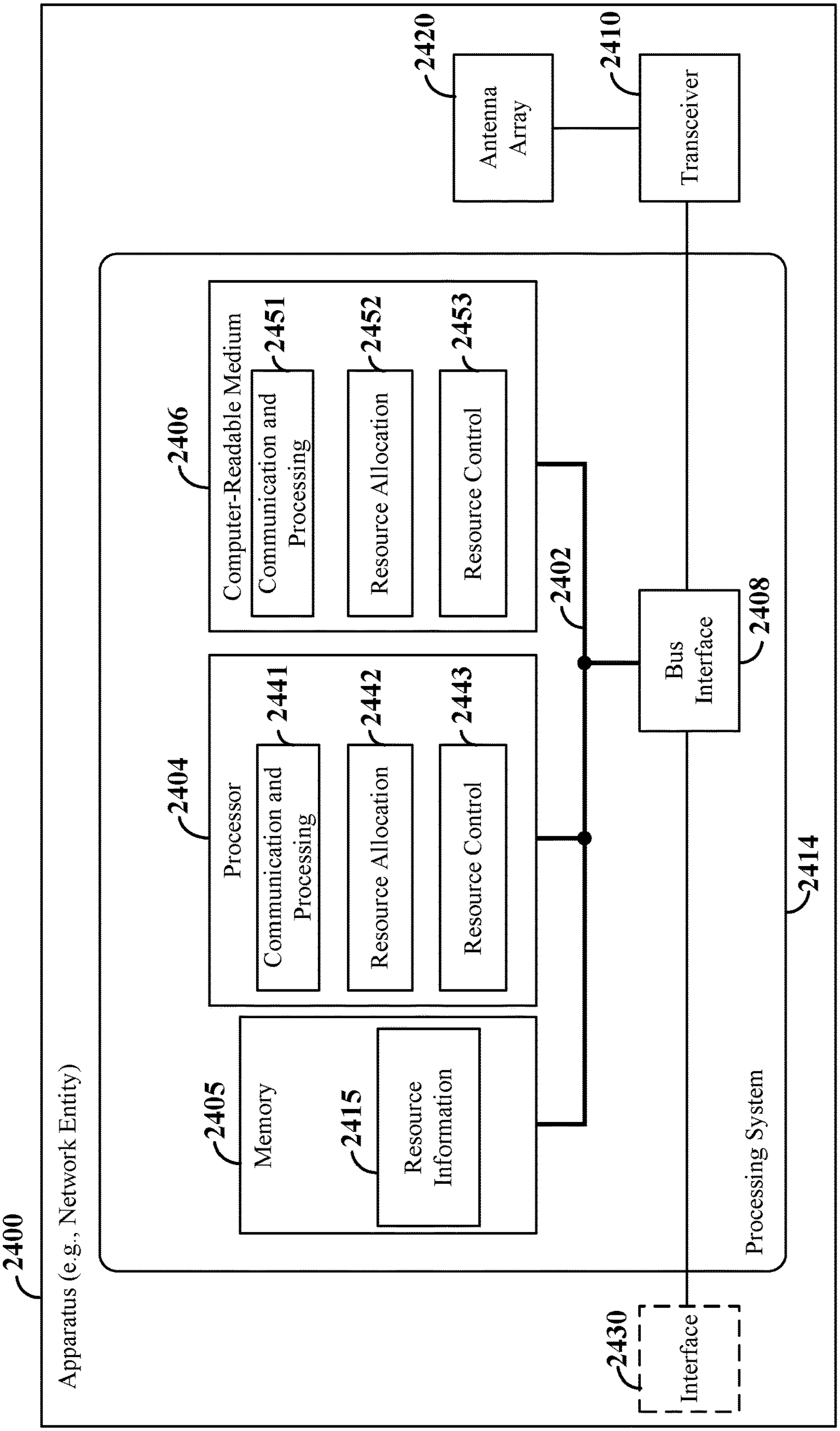
FIG. 24 is a block diagram conceptually illustrating an example of a hardware implementation for an apparatus (e.g., a network entity) employing a processing system according to some aspects.

FIG. 24 is a conceptual diagram illustrating an example of a hardware implementation for an apparatus 2400 employing a processing system 2414. In some implementations, the apparatus 2400 may correspond to any of the network entities, CUs, DUs, RUs, base stations, or scheduling entities shown in any of FIGS. 1-19. In some implementations, the apparatus 2400 may correspond to any of the UEs or scheduled entities shown in any of FIGS. 1-3, 5-10, 15, and 17-19 (e.g., to implement the techniques described herein in a peer-to-peer configuration in conjunction with the apparatus 2000, where the DCI referred to herein may be instead referred to as control information (CI)).

In accordance with various aspects of the disclosure, an element, or any portion of an element, or any combination of elements may be implemented with the processing system 2414. The processing system may include one or more processors (referred to herein as the processor 2404, for convenience). The processing system 2414 may be substantially the same as the processing system 2014 illustrated in FIG. 20, including a bus interface 2408, a bus 2402, one or more memories (referred to herein as the memory 2405, for convenience), a processor 2404, a computer-readable medium 2406, a transceiver 2410, and an antenna array 2420. The memory 2405 may store resource information 2415 (e.g., indicative of UE resource usage) used by the processor 2404 in cooperation with the transceiver 2410 for communication operations as described herein. Furthermore, the apparatus 2400 may include an interface 2430 (e.g., a network interface) that provides a means for communicating with at least one other apparatus within a core network and with at least one radio access network.

The apparatus 2400 may be configured to perform any one or more of the operations described herein (e.g., as described above in conjunction with FIGS. 1-19 and as described below in conjunction with FIGS. 25-26). In some aspects of the disclosure, the processor 2404, as utilized in the apparatus 2400, may include circuitry configured for various functions.

The processor 2404 may be configured to generate, schedule, and modify a resource assignment or grant of time-frequency resources (e.g., a set of one or more resource elements). For example, the processor 2404 may schedule time-frequency resources within a plurality of time division duplex (TDD) and/or frequency division duplex (FDD) subframes, slots, and/or mini-slots to carry user data traffic and/or control information to and/or from multiple UEs.

The processor 2404 may be configured to schedule resources for the transmission of sidelink signals, downlink signals, or uplink signals. The processor 2404 may be configured to schedule resources for control information (e.g., DCI) operations.

In some aspects of the disclosure, the processor 2404 may include communication and processing circuitry 2441. The communication and processing circuitry 2441 may be configured to communicate with network entities. The communication and processing circuitry 2441 may include one or more hardware components that provide the physical structure that performs various processes related to communication (e.g., signal reception and/or signal transmission) as described herein. The communication and processing circuitry 2441 may further include one or more hardware components that provide the physical structure that performs various processes related to signal processing (e.g., processing a received signal and/or processing a signal for transmission) as described herein. The communication and processing circuitry 2441 may further be configured to execute communication and processing software 2451 included on the computer-readable medium 2406 to implement one or more functions described herein.

In some implementations wherein the communication involves receiving information, the communication and processing circuitry 2441 may obtain information from a component of the apparatus 2400 (e.g., from the transceiver 2410 that receives the information via radio frequency signaling or some other type of signaling suitable for the applicable communication medium), process (e.g., decode) the information, and output the processed information. For example, the communication and processing circuitry 2441 may output the information to another component of the processor 2404, to the memory 2405, or to the bus interface 2408. In some examples, the communication and processing circuitry 2441 may receive one or more of signals, messages, other information, or any combination thereof. In some examples, the communication and processing circuitry 2441 may receive information via one or more channels. In some examples, the communication and processing circuitry 2441 and/or the transceiver 2410 may include functionality for a means for receiving. In some examples, the communication and processing circuitry 2441 may include functionality for a means for decoding. In some examples, the communication and processing circuitry 2441 may include functionality for a means for receiving signal measurement information from a UE.

In some implementations wherein the communication involves sending (e.g., transmitting) information, the communication and processing circuitry 2441 may obtain information (e.g., from another component of the processor 2404, the memory 2405, or the bus interface 2408), process (e.g., encode) the information, and output the processed information. For example, the communication and processing circuitry 2441 may output the information to the transceiver 2410 (e.g., that transmits the information via radio frequency signaling or some other type of signaling suitable for the applicable communication medium). In some examples, the communication and processing circuitry 2441 may send one or more of signals, messages, other information, or any combination thereof. In some examples, the communication and processing circuitry 2441 may send information via one or more channels. In some examples, the communication and processing circuitry 2441 and/or the transceiver 2410 may include functionality for a means for transmitting. In some examples, the communication and processing circuitry 2441 may include functionality for a means for encoding. In some examples, the communication and processing circuitry 2441 may include functionality for a means for transmitting information to a UE.

The processor 2404 may include resource allocation circuitry 2442 configured to perform resource allocation-related operations as discussed herein (e.g., one or more of the operations described above in conjunction with FIGS. 10-19). The resource allocation circuitry 2442 may be configured to execute resource allocation software 2452 included on the computer-readable medium 2406 to implement one or more functions described herein.

The resource allocation circuitry 2442 may include functionality for a means for outputting a message (e.g., as described above in conjunction with FIGS. 10-19). For example, the resource allocation circuitry 2442 may send a DCI to a UE on a designated search space (e.g., via a PDCCH).

The resource allocation circuitry 2442 may include functionality for a means for generating a message (e.g., as described above in conjunction with FIGS. 10-19). For example, the resource allocation circuitry 2442 may generate a DCI based on an RNTI and/or other information.

The processor 2404 may include resource control circuitry 2443 configured to perform resource control-related operations as discussed herein (e.g., one or more of the operations described above in conjunction with FIGS. 10-19). The resource control circuitry 2443 may be configured to execute communication mode software 2453 included on the computer-readable medium 2406 to implement one or more functions described herein.

The resource control circuitry 2443 may include functionality for a means for outputting a message (e.g., as described above in conjunction with FIGS. 10-19). For example, the resource control circuitry 2443 may output a message (e.g., a DCI, a groupcast message, etc.) for transmission to at least one UE (e.g., via a PDCCH, a PDSCH, etc.).

The resource control circuitry 2443 may include functionality for a means for obtaining a message (e.g., as described above in conjunction with FIGS. 10-19). For example, the resource control circuitry 2443 may obtain (e.g., receive) a message from a UE (e.g., via a PUSCH).

The resource control circuitry 2443 may include functionality for a means for encoding (e.g., as described above in conjunction with FIGS. 10-19). For example, the resource control circuitry 2443 may encode a message to be sent to a UE.

In some examples, the apparatus 2400 shown and described above in connection with FIG. 24 may be a disaggregated base station. For example, the apparatus 2400 shown in FIG. 24 may include the CU and optionally one or more DUs/RUs of the disaggregated base station. Other DUs/RUs associated with the apparatus 2400 may be distributed throughout the network. In some examples, the DUs/RUs may correspond to TRPs associated with the network entity. In some examples, the CU and/or DU/RU of the disaggregated base station (e.g., within the apparatus 2400) may generate DCI and provide the DCI to the user equipment.

Figure 25:
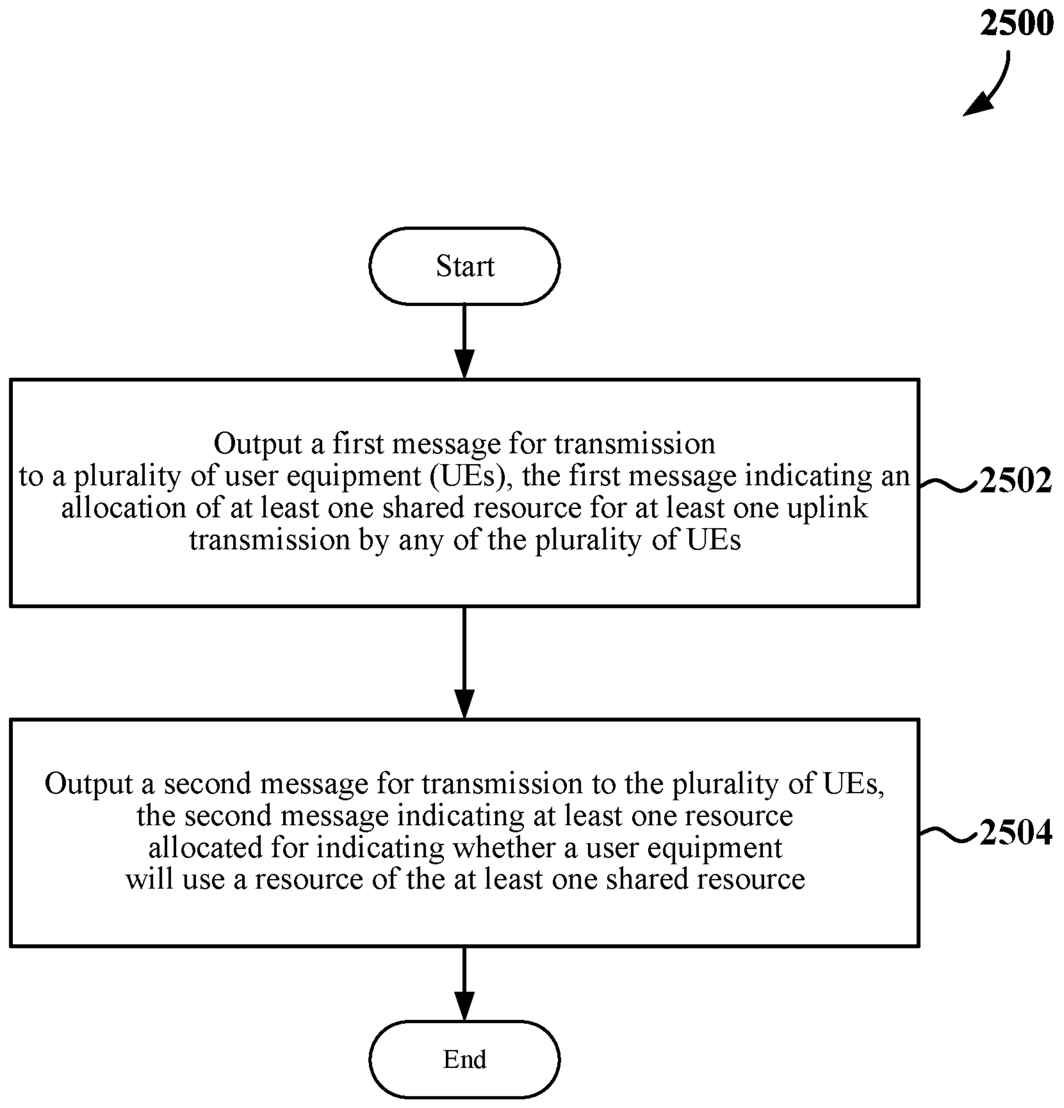
FIG. 25 is a flow chart illustrating an example communication method involving resource allocation according to some aspects.

FIG. 25 is a flow chart illustrating an example method 2500 for wireless communication in accordance with some aspects of the present disclosure. As described below, some or all illustrated features may be omitted in a particular implementation within the scope of the present disclosure, and some illustrated features may not be required for implementation of all examples. In some examples, the method 2500 (e.g., a method for wireless communication) may be carried out by the apparatus 2400 illustrated in FIG. 24, the apparatus 702 illustrated in FIG. 7, the wireless node illustrated in FIG. 7, or another wireless node. In some examples, the method 2500 may be carried out by any suitable apparatus or means for carrying out the functions or algorithm described below.

At block 2502, the apparatus may output a first message for transmission to a plurality of user equipment (UEs), the first message indicating an allocation of at least one shared resource for at least one transmission by any of the plurality of UEs. In some examples, the resource allocation circuitry 2442, shown and described in FIG. 24, may provide a means to output a first message for transmission to a plurality of user equipment (UEs), the first message indicating an allocation of at least one shared resource for at least one transmission by any of the plurality of UEs. In some examples, the resource allocation circuitry 2442 together with the communication and processing circuitry 2441 and the transceiver 2410, shown and described in FIG. 24, may provide a means to output a first message for transmission to a plurality of user equipment (UEs), the first message indicating an allocation of at least one shared resource for at least one transmission by any of the plurality of UEs. In some examples, the communication and processing circuitry 2441 and/or the transceiver 2410, shown and described in FIG. 24, may provide a means to output a first message for transmission to a plurality of user equipment (UEs), the first message indicating an allocation of at least one shared resource for at least one transmission by any of the plurality of UEs.

At block 2504, the apparatus may output a second message for transmission to the plurality of UEs, the second message indicating at least one shared resource allocated for indicating whether a user equipment will use a resource of the at least one shared resource. In some examples, the resource control circuitry 2443, shown and described in FIG. 24, may provide a means to output a second message for transmission to the plurality of UEs, the second message indicating at least one shared resource allocated for indicating whether a user equipment will use a resource of the at least one shared resource. In some examples, the resource control circuitry 2443 together with the communication and processing circuitry 2441 and the transceiver 2410, shown and described in FIG. 24, may provide a means to a second message for transmission to the plurality of UEs, the second message indicating at least one shared resource allocated for indicating whether a user equipment will use a resource of the at least one shared resource. In some examples, the communication and processing circuitry 2441 and/or the transceiver 2410, shown and described in FIG. 24, may provide a means to output a second message for transmission to the plurality of UEs, the second message indicating at least one shared resource allocated for indicating whether a user equipment will use a resource of the at least one shared resource.

In some examples, the at least one shared resource may include a plurality of physical uplink shared channel (PUSCH) occasions. In some examples, the first resource may include at least one PUSCH occasion of the plurality of PUSCH occasions.

In some examples, the apparatus may transmit the first message and the second message. In some examples, the apparatus is configured as a network entity.

Figure 26:
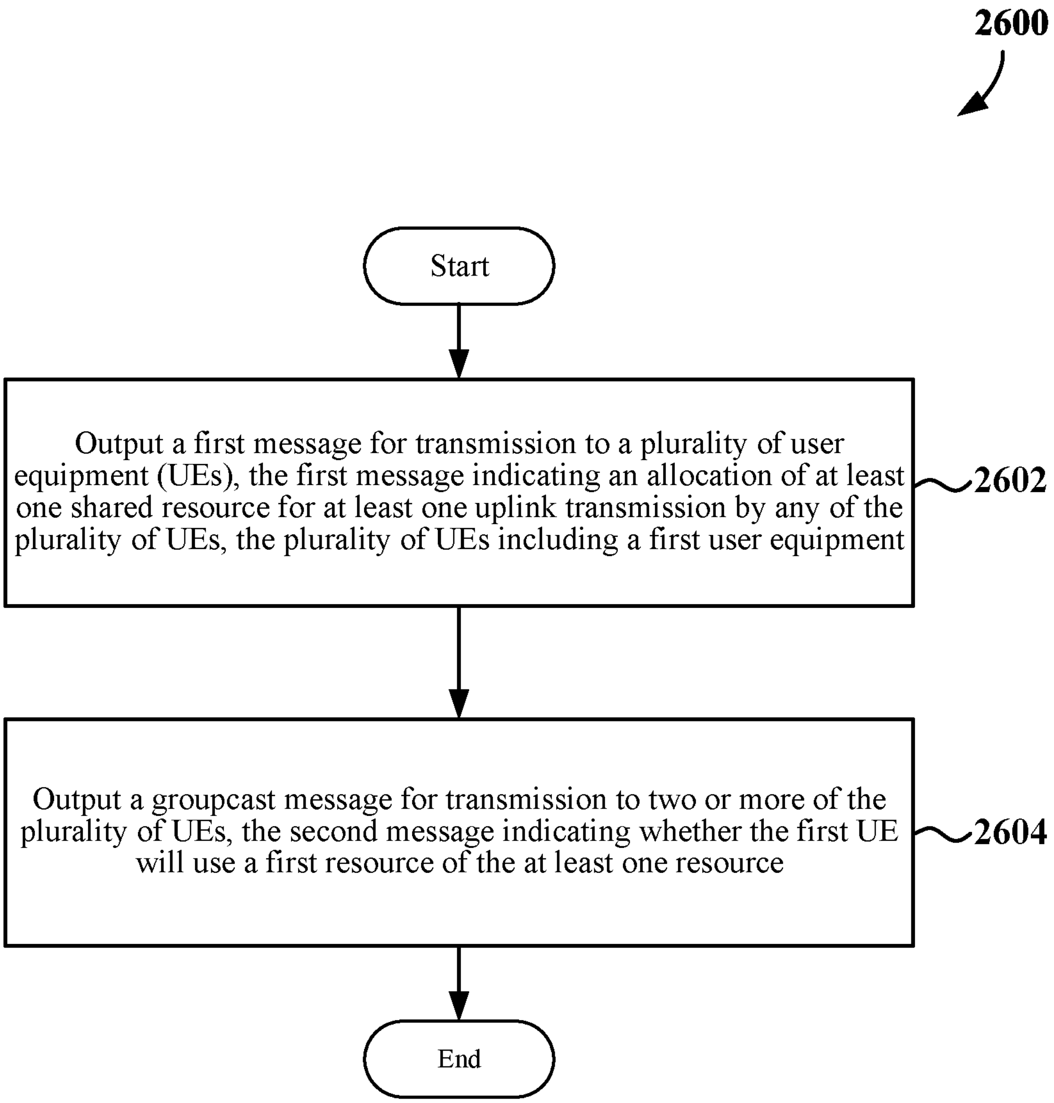
FIG. 26 is a flow chart illustrating an example communication method involving indicating whether a UE will use a resource according to some aspects.

FIG. 26 is a flow chart illustrating an example method 2600 for wireless communication in accordance with some aspects of the present disclosure. As described below, some or all illustrated features may be omitted in a particular implementation within the scope of the present disclosure, and some illustrated features may not be required for implementation of all examples. In some examples, the method 2600 (e.g., a method for wireless communication) may be carried out by the apparatus 2400 illustrated in FIG. 24, the apparatus 702 illustrated in FIG. 7, the wireless node illustrated in FIG. 7, or another wireless node. In some examples, the method 2600 may be carried out by any suitable apparatus or means for carrying out the functions or algorithm described below.

At block 2602, the apparatus may output a first message for transmission to a plurality of user equipment (UEs), the first message indicating an allocation of at least one shared resource for at least one transmission by any of the plurality of UEs, the plurality of UEs including a first user equipment (UE). In some examples, the resource allocation circuitry 2442, shown and described in FIG. 24, may provide a means to output a first message for transmission to a plurality of user equipment (UEs), the first message indicating an allocation of at least one shared resource for at least one transmission by any of the plurality of UEs, the plurality of UEs including a first user equipment (UE). In some examples, the resource allocation circuitry 2442 together with the communication and processing circuitry 2441 and the transceiver 2410, shown and described in FIG. 24, may provide a means to output a first message for transmission to a plurality of user equipment (UEs), the first message indicating an allocation of at least one shared resource for at least one transmission by any of the plurality of UEs, the plurality of UEs including a first user equipment (UE). In some examples, the communication and processing circuitry 2441 and/or the transceiver 2410, shown and described in FIG. 24, may provide a means to output a first message for transmission to a plurality of user equipment (UEs), the first message indicating an allocation of at least one shared resource for at least one transmission by any of the plurality of UEs, the plurality of UEs including a first user equipment (UE).

At block 2604, the apparatus may output a groupcast message for transmission to two or more of the plurality of UEs, the groupcast message indicating whether the first UE will use a first resource of the at least one shared resource. In some examples, the resource control circuitry 2443, shown and described in FIG. 24, may provide a means to output a groupcast message for transmission to two or more of the plurality of UEs, the groupcast message indicating whether the first UE will use a first resource of the at least one shared resource. In some examples, the resource control circuitry 2443 together with the communication and processing circuitry 2441 and the transceiver 2410, shown and described in FIG. 24, may provide a means to output a groupcast message for transmission to two or more of the plurality of UEs, the groupcast message indicating whether the first UE will use a first resource of the at least one shared resource. In some examples, the communication and processing circuitry 2441 and/or the transceiver 2410, shown and described in FIG. 24, may provide a means to output a groupcast message for transmission to two or more of the plurality of UEs, the groupcast message indicating whether the first UE will use a first resource of the at least one shared resource.

In some examples, the first message may be a configured grant. In some examples, the first message may be a dynamic grant.

In some examples, the apparatus may obtain a second message from the first UE. In some examples, the second message may indicate whether the first UE will use the first resource.

In some examples, the at least one shared resource may include a plurality of physical uplink shared channel (PUSCH) occasions. In some examples, the first resource may include at least one PUSCH occasion of the plurality of PUSCH occasions.

In some examples, the apparatus may transmit the first message and the groupcast message. In some examples, the apparatus is configured as a network entity.

Referring again to FIG. 24, in one configuration, the apparatus 2400 includes means for outputting a first message for transmission to a plurality of user equipment (UEs), the first message indicating an allocation of at least one shared resource for at least one transmission by two or more of the plurality of UEs, and means for outputting a second message for transmission to two or more of the plurality of UEs, the second message indicating at least one shared resource allocated for indicating whether the first UE will use a resource of the at least one shared resource. In one configuration, the apparatus 2400 includes means for outputting a first message for transmission to a plurality of user equipment (UEs), the first message indicating an allocation of at least one shared resource for at least one transmission by any of the plurality of UEs, the plurality of UEs including a first user equipment (UE), and means for outputting a groupcast message for transmission to two or more of the plurality of UEs, the groupcast message indicating whether the first UE will use a first resource of the at least one shared resource. In one aspect, the aforementioned means may be the processor 2404 shown in FIG. 24 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2404 is merely provided as an example, and other means for carrying out the described functions may be included within various aspects of the present disclosure, including but not limited to the instructions stored in the computer-readable medium 2406, or any other suitable apparatus or means described in any of FIGS. 1-3, 5-10, 15, 17-19, and 24, and utilizing, for example, the methods and/or algorithms described herein in relation to FIGS. 25-26.

The methods shown in FIGS. 21-23 and 25-26 may include additional aspects, such as any single aspect or any combination of aspects described below and/or in connection with one or more other processes described elsewhere herein. The following provides an overview of several aspects of the present disclosure.

Aspect 1: A method for wireless communication at a wireless node, the method comprising: obtaining a first message, the first message indicating an allocation of at least one shared resource for at least one transmission by any of a plurality of user equipment (UEs); and outputting a second message for transmission to at least one user equipment (UE) of the plurality of UEs, the second message indicating whether the wireless node will use a first resource of the at least one shared resource.

Aspect 2: The method of aspect 1, further comprising: obtaining a third message, the third message indicating a resource, wherein the second message is output for transmission based on the resource.

Aspect 3: The method of any of aspects 1 through 2, wherein the outputting the second message for transmission to at least one UE comprises: outputting the second message for transmission via a configured measurement resource.

Aspect 4: The method of any of aspects 1 through 3, wherein the outputting the second message for transmission to at least one second user equipment comprises: outputting the second message for transmission via a cross-link interference (CLI) measurement resource.

Aspect 5: The method of any of aspects 1 through 2, wherein the outputting the second message for transmission to at least one second user equipment comprises: outputting the second message for transmission via backscatter signaling.

Aspect 6: The method of any of aspects 1, 2, and 5, wherein the outputting the second message for transmission to at least one second user equipment comprises: outputting the second message for transmission via backscatter signaling according to a reference signal schedule.

Aspect 7: The method of aspect 6, further comprising: obtaining the reference signal schedule.

Aspect 8: The method of any of aspects 1 through 4, wherein the outputting the second message for transmission to at least one second user equipment comprises: outputting the second message for transmission via an uplink channel.

Aspect 9: The method of any of aspects 1 through 2, wherein the outputting the second message for transmission to at least one second user equipment comprises: outputting the second message for transmission via a downlink channel, via a sidelink channel, or via on-off keying signaling.

Aspect 10: The method of any of aspects 1 through 9, wherein: the at least one shared resource comprises a plurality of physical uplink shared channel (PUSCH) occasions; and the first resource comprises at least one PUSCH occasion of the plurality of PUSCH occasions.

Aspect 11: The method of aspect 10, wherein the first resource comprises a subset of a first PUSCH occasion of the plurality of PUSCH occasions.

Aspect 12: The method of any of aspects 1 through 11, wherein the first message comprises a configured grant or a dynamic grant.

Aspect 13: The method of any of aspects 1 through 12, further comprising: outputting a third message for transmission to a network entity, the third message indicating whether the wireless node will use the first resource of the at least one shared resource.

Aspect 14: The method of any of aspects 1 through 13, further comprising: receiving the first message and transmitting the second message, wherein the wireless node is configured as a first UE (e.g., the first UE).

Aspect 15: A method for wireless communication at a wireless node, the method comprising: obtaining a first message from a network entity, the first message indicating an allocation of at least one shared resource for at least one transmission by any of a plurality of user equipment (UEs), the plurality of UEs including a first user equipment (UE); obtaining a second message from the first UE, the second message indicating whether the first UE will use a first resource of the at least one shared resource; and outputting a third message for transmission via the first resource according to a first communication mode selected based on the second message.

Aspect 16: The method of aspect 15, further comprising: switching from a second communication mode to the first communication mode to output the third message for transmission via the first resource based on the second message indicating that the first UE will not use the first resource.

Aspect 17: The method of aspect 16, wherein: the first communication mode is associated with a first transmit power; and the second communication mode is associated with a second transmit power that is different from the first transmit power.

Aspect 18: The method of any of aspects 16 through 17, wherein: the first communication mode is associated with single-user multiple-input multiple-output (MIMO) communication; and the second communication mode is associated with multi-user MIMO communication.

Aspect 19: The method of any of aspects 16 through 17, wherein the second communication mode is associated with non-orthogonal multiple access (NOMA) communication or rate-splitting communication.

Aspect 20: The method of any of aspects 13 through 19, further comprising: invoking transmission of a backscatter reference signal according to a reference signal schedule.

Aspect 21: The method of aspect 20, further comprising: outputting the reference signal schedule for transmission.

Aspect 22: The method of any of aspects 15 through 21, further comprising: obtaining a fourth message, the fourth message indicating a resource, wherein the second message is obtained based on the resource.

Aspect 23: The method of any of aspects 15 through 21, further comprising: receiving the first message and the second message, and transmitting the third message, wherein the wireless node is configured as a UE.

Aspect 24: A method for wireless communication at a wireless node, the method comprising: obtaining a first message from a network entity, the first message indicating an allocation of at least one shared resource for at least one transmission by any of a plurality of user equipment (UEs), the plurality of UEs including a first user equipment (UE) and a second UE; obtaining a groupcast message from the network entity, the groupcast message indicating whether the first UE will use a first resource of the at least one shared resource; and outputting a second message for transmission via the first resource according to a first communication mode selected based on the groupcast message.

Aspect 25: The method of aspect 24, further comprising: switching from a second communication mode to the first communication mode to output the second message for transmission via the first resource based on the second message indicating that the first UE will not use the first resource.

Aspect 26: The method of any of aspects 24 through 25, wherein: the first communication mode is associated with a first transmit power; and the second communication mode is associated with a second transmit power that is different from the first transmit power.

Aspect 27: The method of any of aspects 24 through 26, wherein the second communication mode is associated with (MIMO) communication, non-orthogonal multiple access (NOMA) communication, or rate-splitting communication.

Aspect 28: The method of any of aspects 24 through 27, further comprising: receiving the first message and the groupcast message, and transmitting the second message, wherein the wireless node is configured as a UE.

Aspect 29: A method for wireless communication at a wireless node, the method comprising: outputting a first message for transmission to a plurality of user equipment (UEs), the first message indicating an allocation of at least one shared resource for at least one transmission by any of the plurality of UEs, the plurality of UEs including a first user equipment (UE); and outputting a groupcast message for transmission to two or more of the plurality of UEs, the groupcast message indicating whether the first UE will use a first resource of the at least one shared resource.

Aspect 30: The method of aspect 29, further comprising: obtain a second message from the first UE, the second message indicating whether the first UE will use the first resource.

Aspect 31: The method of any of aspects 29 through 30, wherein: the at least one shared resource comprises a plurality of physical uplink shared channel (PUSCH) occasions; and the first resource comprises at least one PUSCH occasion of the plurality of PUSCH occasions.

Aspect 32: The method of any of aspects 29 through 31, further comprising: transmitting the first message and the groupcast message, wherein the wireless node is configured as a network entity.

Aspect 33: A user equipment, comprising: at least one transceiver; one or more memories storing processor-executable code; and one or more processors configured to execute the processor-executable code and cause the user equipment to perform a method in accordance with any one or more of aspects 1 through 13, wherein the at least one transceiver is configured to receive the first message and transmit the second message.

Aspect 34: An apparatus configured for communication comprising at least one means for performing any one or more of aspects 1 through 14.

Aspect 35: A non-transitory computer-readable medium storing computer-executable code, comprising code for causing an apparatus to perform any one or more of aspects 1 through 14.

Aspect 36: An apparatus, comprising: one or more memories storing processor-executable code; and one or more processors configured to execute the processor-executable code and cause the apparatus to perform a method in accordance with any one or more of aspects 1 through 13.

Aspect 37: A user equipment, comprising: at least one transceiver; one or more memories storing processor-executable code; and one or more processors configured to execute the processor-executable code and cause the user equipment to perform a method in accordance with any one or more of aspects 15 through 22, wherein the at least one transceiver is configured to receive the first message and the second message and transmit the third message.

Aspect 38: An apparatus configured for communication comprising at least one means for performing any one or more of aspects 15 through 23.

Aspect 39: A non-transitory computer-readable medium storing computer-executable code, comprising code for causing an apparatus to perform any one or more of aspects 15 through 23.

Aspect 40: An apparatus, comprising: one or more memories storing processor-executable code; and one or more processors configured to execute the processor-executable code and cause the apparatus to perform a method in accordance with any one or more of aspects 15 through 22.

Aspect 41: A user equipment, comprising: at least one transceiver; one or more memories storing processor-executable code; and one or more processors configured to execute the processor-executable code and cause the user equipment to perform a method in accordance with any one or more of aspects 24 through 27, wherein the at least one transceiver is configured to receive the first message and the groupcast message and transmit the second message.

Aspect 42: An apparatus configured for communication comprising at least one means for performing any one or more of aspects 24 through 28.

Aspect 43: A non-transitory computer-readable medium storing computer-executable code, comprising code for causing an apparatus to perform any one or more of aspects 24 through 28.

Aspect 44: An apparatus, comprising: one or more memories storing processor-executable code; and one or more processors configured to execute the processor-executable code and cause the apparatus to perform a method in accordance with any one or more of aspects 24 through 27.

Aspect 45: A network entity, comprising: at least one transceiver; one or more memories storing processor-executable code; and one or more processors configured to execute the processor-executable code and cause the network entity to perform a method in accordance with aspect 29, wherein the at least one transceiver is configured to transmit the first message and the groupcast message.

Aspect 46: An apparatus configured for communication comprising at least one means for performing any one or more of aspects 29 through 32.

Aspect 47: A non-transitory computer-readable medium storing computer-executable code, comprising code for causing an apparatus to perform any one or more of aspects 29 through 32.

Aspect 48: An apparatus, comprising: a memory comprising instructions; and one or more processors configured to execute the processor-executable code and cause the apparatus to perform a method in accordance with aspect 31.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-26 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 5, 6, 7, 8, 9, 10, 12, 13, 14, 15, 16, 17, 18, 19, 20, and 24 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more" (i.e., "at least one") Unless specifically stated otherwise, the term "some" refers to one or more. A phrase referring to "one or more" or "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first user equipment (UE), comprising:
one or more transceivers;
one or more memories configured to store instructions; and
one or more processors configured to execute the instructions to cause the first UE to:
receive, via the one or more transceivers, a first message indicating an allocation of at least one shared resource for at least one transmission by any of a plurality of user equipments (UEs); and
transmit, via the one or more transceivers and to at least one UE of the plurality of UEs, a second message indicating that the first UE will not use a first resource of the at least one shared resource.

2. The first UE of claim 1, wherein the one or more processors are further configured to execute the instructions to cause the first UE to:
receive, via the one or more transceivers, a third message indicating a resource, wherein the transmission of the second message is based on the resource.

3. The first UE of claim 1, wherein the one or more processors are further configured to execute the instructions to cause the first UE to:
transmit the second message via the one or more transceivers and a configured measurement resource.

4. The first UE of claim 1, wherein the one or more processors are further configured to execute the instructions to cause the first UE to:
transmit the second message via the one or more transceivers and a cross-link interference (CLI) measurement resource.

5. The first UE of claim 1, wherein the one or more processors are further configured to execute the instructions to cause the first UE to:
transmit the second message via the one or more transceivers and backscatter signaling.

6. The first UE of claim 1, wherein the one or more processors are further configured to execute the instructions to cause the first UE to at least one of:
transmit the second message via the one or more transceivers and backscatter signaling according to a reference signal schedule; or
receive, via the one or more transceivers, the reference signal schedule.

7. The first UE of claim 1, wherein the one or more processors are further configured to execute the instructions to cause the first UE to:
transmit the second message via the one or more transceivers and an uplink channel.

8. The first UE of claim 1, wherein the one or more processors are further configured to execute the instructions to cause the first UE to:
transmit the second message via the one or more transceivers, and via a downlink channel, via a sidelink channel, or via on-off keying signaling.

9. The first UE of claim 1, wherein:
the at least one shared resource comprises a plurality of physical uplink shared channel (PUSCH) occasions; and
the first resource comprises at least one PUSCH occasion of the plurality of PUSCH occasions.

10. The first UE of claim 9, wherein the first resource comprises a subset of a first PUSCH occasion of the plurality of PUSCH occasions.

11. The first UE of claim 1, wherein the first message comprises a configured grant or a dynamic grant.

12. The first UE of claim 1, wherein the one or more processors are further configured to execute the instructions to cause the first UE to:
transmit, via the one or more transceivers and to a network entity, a third message indicating whether the first UE will use the first resource of the at least one shared resource.

13. The first UE of claim 1, wherein the allocation of the at least one shared resource for at least one transmission by any of the plurality of UEs comprises an allocation of the at least one shared resource for concurrent transmissions by two or more of the plurality of UEs.

14. A first user equipment (UE), comprising:
one or more transceivers;
one or more memories configured to store instructions; and
one or more processors configured to execute the instructions to cause the first UE to:
receive, via the one or more transceivers and from a network entity, a first message indicating an allocation of at least one shared resource for at least one transmission by any of a plurality of user equipments (UEs), the plurality of UEs including a second UE;
receive, via the one or more transceivers and from the second UE, a second message indicating whether the second UE will use a first resource of the at least one shared resource; and
transmit a third message, via the one or more transceivers and the first resource, according to a first communication mode selected based on the second message.

15. The first UE of claim 14, wherein the one or more processors are further configured to execute the instructions to cause the first UE to:
switch from a second communication mode to the first communication mode to transmit the third message, via the one or more transceivers and the first resource, based on the second message indicating that the second UE will not use the first resource.

16. The first UE of claim 15, wherein:
the first communication mode is associated with a first transmit power; and
the second communication mode is associated with a second transmit power that is different from the first transmit power.

17. The first UE of claim 15, wherein:
the first communication mode is associated with single-user multiple-input multiple-output (MIMO) communication; and
the second communication mode is associated with multi-user MIMO communication.

18. The first UE of claim 15, wherein the second communication mode is associated with non-orthogonal multiple access (NOMA) communication or rate-splitting communication.

19. The first UE of claim 14, wherein the one or more processors are further configured to execute the instructions to cause the first UE to at least one of:
invoke transmission of a backscatter reference signal according to a reference signal schedule; or
transmit the reference signal schedule via the one or more transceivers.

20. The first UE of claim 14, wherein the one or more processors are further configured to execute the instructions to cause the first UE to:

receive, via the one or more transceivers, a fourth message indicating a resource, wherein the second message is received based on the resource.

21. A first user equipment (UE), comprising:

one or more transceivers;

one or more memories configured to store instructions; and one or more processors configured to execute the instructions to cause the first UE to:

receive, via the one or more transceivers and from a network entity, a first message indicating an allocation of at least one shared resource for at least one transmission by any of a plurality of user equipments (UEs), the plurality of UEs including a first user equipment (UE) and a second UE and a third UE;

receive, via the one or more transceivers and from the network entity, a groupcast message indicating whether the second UE will use a first resource of the at least one shared resource; and transmit a second message, via the one or more transceivers and the first resource, according to a first communication mode selected based on the groupcast message.

22. The first UE of claim 21, wherein the one or more processors are further configured to execute the instructions to cause the first UE to:

switch from a second communication mode to the first communication mode to transmit the second message, via the one or more transceivers and the first resource, based on the second message indicating that the second UE will not use the first resource.

23. The first UE of claim 22, wherein:

the first communication mode is associated with a first transmit power; and the second communication mode is associated with a second transmit power that is different from the first transmit power.

24. The first UE of claim 22, wherein the second communication mode is associated with (MIMO) communication, non-orthogonal multiple access (NOMA) communication, or rate-splitting communication.

25. A network entity, comprising:

one or more transceivers;

one or more memories configured to store instructions; and one or more processors configured to execute the instructions to cause the network entity to:

transmit, via the one or more transceivers and to a plurality of user equipments (UEs), a first message indicating an allocation of at least one shared resource for at least one transmission by any of the plurality of UEs, the plurality of UEs including a first user equipment (UE); and transmit, via the one or more transceivers and to two or more of the plurality of UEs, a groupcast message indicating that the first UE will not use a first resource of the at least one shared resource.

26. The network entity of claim 25, wherein the one or more processors are further configured to execute the instructions to cause the network entity to:

receive, via the one or more transceivers and from the first UE, a second message indicating whether the first UE will use the first resource.

27. The network entity of claim 25, wherein:

the at least one shared resource comprises a plurality of physical uplink shared channel (PUSCH) occasions; and the first resource comprises at least one PUSCH occasion of the plurality of PUSCH occasions.

* * * * *